United States Patent
Keravala et al.

(10) Patent No.: US 12,005,588 B2
(45) Date of Patent: Jun. 11, 2024

(54) INDUSTRIAL ROBOTIC PLATFORMS

(71) Applicant: Off-World, Inc., Pasadena, CA (US)

(72) Inventors: James Keravala, Pasadena, CA (US); Alicia Teresa Kavelaars, Berkeley, CA (US); James Jason Murray, Liege (BE); Mark Eugene Nall, Huntsville, AL (US); Joshua Jeremy Izenberg, Washington, DC (US); Amaresh Kollipara, San Francisco, CA (US)

(73) Assignee: Off-World, Inc., Altadena, CA (US)

( * ) Notice: Subject to any disclaimer, the term of this patent is extended or adjusted under 35 U.S.C. 154(b) by 446 days.

(21) Appl. No.: 17/070,775

(22) Filed: Oct. 14, 2020

(65) Prior Publication Data

US 2021/0116889 A1 Apr. 22, 2021

Related U.S. Application Data

(60) Provisional application No. 62/923,357, filed on Oct. 18, 2019, provisional application No. 62/923,376, filed on Oct. 18, 2019.

(51) Int. Cl.
*B25J 9/16* (2006.01)
*B25J 5/00* (2006.01)
(Continued)

(52) U.S. Cl.
CPC ............... *B25J 9/1682* (2013.01); *B25J 5/00* (2013.01); *B25J 9/0084* (2013.01); *B25J 9/161* (2013.01);
(Continued)

(58) Field of Classification Search
CPC . B25J 9/1682; B25J 5/00; B25J 9/0084; B25J 9/161; B25J 9/163; B25J 13/06;
(Continued)

(56) References Cited

U.S. PATENT DOCUMENTS

| | | |
|---|---|---|
| 5,803,203 A | 9/1998 | Williams, II |
| 6,263,989 B1 | 7/2001 | Won |

(Continued)

FOREIGN PATENT DOCUMENTS

| | | |
|---|---|---|
| CN | 102704932 | 10/2012 |
| CN | 102704932 A | 10/2012 |

(Continued)

OTHER PUBLICATIONS

U.S. Appl. No. 17/070,748, filed Oct. 14, 2020, Systems and Methods for Industrial Robotics.
(Continued)

*Primary Examiner* — Jaime Figueroa
*Assistant Examiner* — Joshua Alexander Garza
(74) *Attorney, Agent, or Firm* — Knobbe, Martens, Olson & Bear, LLP

(57) ABSTRACT

Industrial robotic platforms are described. The robotic platform includes a universal platform configured to attach to interchangeable task-specific tooling systems and mobility systems. The robots may be mining robots, with a mining-specific tooling system attached to the universal platform, and configured for mining tasks. The platform is modular and may be used for other industrial applications and/or robot types, such as construction, satellite swarms, fuel production, disaster recovery, communications, remote power, and others. The robot may be included in a swarm or colony as part of an overall autonomous architecture. The robot may be part of an architecture having a colony or remote control center that communicates with and monitors the robots.

32 Claims, 16 Drawing Sheets

(51) Int. Cl.
    B25J 9/00      (2006.01)
    B25J 13/06     (2006.01)
    G05B 19/042    (2006.01)
    G05B 19/4155   (2006.01)
(52) U.S. Cl.
    CPC ............... *B25J 9/163* (2013.01); *B25J 13/06* (2013.01); *G05B 19/042* (2013.01); *G05B 19/4155* (2013.01); *G05B 2219/39146* (2013.01); *G05B 2219/40298* (2013.01); *G05B 2219/45004* (2013.01); *G05B 2219/50391* (2013.01)
(58) Field of Classification Search
    CPC ............... B62D 57/032; G05B 19/042; G05B 19/4155; G05B 2219/39146; G05B 2219/40298; G05B 2219/45004; G05B 2219/50391; H04L 67/125; E21C 51/00
    See application file for complete search history.

(56) References Cited

U.S. PATENT DOCUMENTS

| | | | |
|---|---|---|---|
| 8,594,844 | B1 | 11/2013 | Gal |
| 9,827,677 | B1 | 11/2017 | Gilbertson et al. |
| 11,135,717 | B2* | 10/2021 | Skaaksrud ............ B60P 3/007 |
| 11,199,853 | B1* | 12/2021 | Afrouzi ................ B25J 13/006 |
| 11,548,159 | B1* | 1/2023 | Ebrahimi Afrouzi ...... B25J 9/08 |
| 11,738,461 | B2 | 8/2023 | Keravala et al. |
| 2004/0162638 | A1 | 8/2004 | Solomon |
| 2007/0129869 | A1 | 6/2007 | Gudat et al. |
| 2009/0178863 | A1 | 7/2009 | Pink |
| 2010/0057254 | A1 | 3/2010 | Salamanca |
| 2010/0179691 | A1 | 7/2010 | Gal et al. |
| 2010/0191376 | A1 | 7/2010 | Close et al. |
| 2011/0031044 | A1 | 2/2011 | Gal |
| 2011/0054690 | A1 | 3/2011 | Gal |
| 2011/0135189 | A1 | 6/2011 | Lee |
| 2012/0046982 | A1 | 2/2012 | Wellman |
| 2012/0158176 | A1 | 6/2012 | Park et al. |
| 2012/0292120 | A1 | 11/2012 | Ben-Tzvi |
| 2016/0348504 | A1 | 12/2016 | Hanski et al. |
| 2017/0021881 | A1 | 1/2017 | Jacobsen et al. |
| 2017/0057081 | A1 | 3/2017 | Krohne et al. |
| 2017/0151667 | A1 | 6/2017 | Bergstra et al. |
| 2018/0021946 | A1* | 1/2018 | Goldenberg ............ B62D 55/26 901/1 |
| 2018/0266247 | A1 | 9/2018 | Lundh et al. |
| 2018/0361586 | A1* | 12/2018 | Tan ....................... B61G 7/04 |
| 2019/0049931 | A1 | 2/2019 | Tschirschnitz et al. |
| 2019/0248007 | A1* | 8/2019 | Duffy ................. B25J 15/0066 |
| 2019/0301131 | A1 | 10/2019 | Hendron et al. |
| 2019/0339368 | A1 | 11/2019 | Berger et al. |
| 2020/0042018 | A1 | 2/2020 | Chiba |
| 2020/0073363 | A1 | 3/2020 | Albrecht et al. |
| 2020/0311616 | A1 | 10/2020 | Rajkumar et al. |
| 2021/0016433 | A1* | 1/2021 | Bidram ................. B25J 11/008 |
| 2021/0114219 | A1 | 4/2021 | Keravala et al. |
| 2022/0063739 | A1 | 3/2022 | Li et al. |
| 2023/0321813 | A1 | 10/2023 | Talon et al. |

FOREIGN PATENT DOCUMENTS

| | | |
|---|---|---|
| CN | 108673469 | 10/2018 |
| CN | 211223657 | 8/2020 |
| CN | 216508670 | 5/2022 |
| EP | 3 135 441 | 3/2017 |
| KR | 10-2006-0032373 | 4/2006 |
| TW | 202128379 | 8/2021 |
| TW | 202129447 | 8/2021 |
| WO | WO 2013/119942 | 8/2013 |
| WO | WO 2021/076577 A1 | 4/2021 |
| WO | WO 2021/076579 A1 | 4/2021 |
| WO | WO 2023/196482 | 10/2023 |

OTHER PUBLICATIONS

International Preliminary Report on Patentability in PCT/US2020/055516 dated Jan. 14, 2022.
International Search Report and Written Opinion in PCT/US20/55514 dated Feb. 2, 2021.
International Search Report and Written Opinion in PCT/US2020/055516 dated Jan. 22, 2021.
International Preliminary Report on Patentability in PCT/US20/55514 dated Nov. 2, 2021.
International Search Report and Written Opinion in PCT/US2023/017709 dated Aug. 29, 2023.
Lynxmontion, "A4WD3 Rugged Tracked Rover Kit", RobotShop, as printed Feb. 23, 2023, https://jp.robotshop.com/en/products/lynxmotion-a4wd3-rugged-tracked-rover-kit, pp. 1-5.

* cited by examiner

INDUSTRIAL ROBOTIC PLATFORMS

CROSS REFERENCE

Any and all applications for which a foreign or domestic priority claim is identified in the Application Data Sheet as filed with the present application are hereby incorporated by reference under 37 CFR 1.57. For example, this application claims the benefit of U.S. Patent Application No. 62/923,376 titled "SYSTEMS AND METHODS FOR INDUSTRIAL ROBOTICS" and filed Oct. 18, 2019, and the benefit of U.S. Patent Application No. 62/923,357 titled "INDUSTRIAL ROBOTIC PLATFORMS" and filed Oct. 18, 2019, the entirety of each of which is hereby incorporated by reference for all purposes and forms a part of this specification.

BACKGROUND

Field

Features for industrial robotic platforms are described, in particular universal vehicle platforms, that are interchangeable with different payload components and mobility systems, for use with swarm robotic systems.

Description of the Related Art

Robotic vehicles are used to perform various tasks. The use of robots can improve profitability and efficiency while reducing the risk to humans. However, existing solutions for robotic platforms to perform a wide variety of tasks are complex and expensive to manufacture and operate. Improvements in this field are therefore desirable.

SUMMARY

The examples disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the examples described herein provide advantages over existing approaches to industrial robotics.

Industrial robotic platforms are described. The robotic platform may include a universal platform attached to a task-specific tooling system. The robots may be mining robots, with a mining-specific tooling system attached to the universal framework, and configured for mining tasks. The platform is modular and may be used for other industrial applications and/or robot types, such as construction, satellite swarms, fuel production, disaster recovery, communications, remote power, and others.

According to one aspect, an industrial bot is described. The bot is configured to operate autonomously in a swarm robotic system to complete a collaborative industrial objective. The industrial bot includes a payload stack configured to perform a bot-specific industrial task. A universal platform stack supports the payload stack, where the payload stack is one among a plurality of different payload stack types that the universal platform stack is configured to support. The universal platform stack includes a robotic hardware platform, a control system, and a robotic software platform. The robotic hardware platform comprises a supporting structure. The control system is configured to control the universal platform stack. The robotic software platform is configured to operate the robotic hardware platform to perform the bot-specific industrial task using the payload stack.

Various embodiments of the various aspects may be implemented. In some embodiments, the robotic hardware platform may include a frame configured to support the payload stack. A mobility system may couple with the frame and move the industrial bot. A power system may power the mobility system and the payload stack. In some embodiments, the control system may include an on-board processor to operate the robotic hardware platform and a robotic software platform. A communications system may transmit and receive data across a colony communications network. A data bus may interface with the on-board processor and one or more hardware platform control modules. The robotic software platform may include a robot operating system to execute a robotic control algorithm to operate the robotic hardware platform to perform the bot-specific industrial task. A hardware processor module may interface with firmware of the one or more hardware platform control modules. A database may store operational data of the robotic hardware platform and the robotic software platform. A user interface module enables a user to remotely access and control the robot operating system.

The robot operating system may execute the robotic control algorithm by establishing autonomous communications with a second industrial bot through a colony communications network. A first data may be received related to the collaborative industrial objective from the second industrial bot via the colony communications network. The bot-specific industrial task may be performed in response to receiving the first data and the collaborative industrial objective is achieved.

The payload stack may include a chisel, a saw, or a sweeper. The industrial bot may be a mining bot configured as a digger bot, a crusher bot, a sweeper bot, a flotation bot, a shotcrete bot, a welder bot, a manipulator bot, a bolting bot, or a pump bot. The bot-specific industrial task may include pre-conditioning rock, breaking rock, collecting excavated rock, filtering/concentrating excavated rock, transporting excavated rock, applying cementitious material to a tunnel, reinforcement bolting a tunnel, or suctioning water from a tunnel.

In some embodiments, the bot may be a mining bot and the payload stack may include a robotic chisel system. The bot may be a mining bot and the payload stack may include a robotic saw system. The bot may be a mining bot and the payload stack may include a robotic sweeper system. The bot may be a mining bot and the payload stack may include a robotic conveyor system. The bot may be a mining bot and the payload stack may include a robotic crusher system.

In some embodiments, the robot may be included in a swarm or colony as part of an overall control architecture. The robot may be part of an architecture including a plurality of the robots grouped in colonies, squads, platoons, etc. and that communicates with other robots. Software at the control center, squad, and/or robot level may analyze various data related to the platform for monitoring, communication, and control of the robots. Artificial intelligence, such as machine learning, may be implemented at the control center, squad, and robot levels for swarm behavior driven by intelligent decision making. The robots may communicate with each other to work autonomously to complete an industrial task. A colony and/or remote control center may communicate with the bots to monitor the autonomous operations of the bots.

In some embodiments, an industrial bot may operate autonomously in a swarm robotic system to complete a collaborative industrial objective. The industrial bot may include a universal platform stack that has a robotic hardware platform with a frame to support the universal platform stack and a payload stack. A mobility system may couple with the frame and move the industrial bot. A power system may power the mobility system and the payload stack. A control system may include an on-board processor to operate the robotic hardware platform and a robotic software platform. A communications system may transmit and receive data across a colony communications network. A data bus may interface with the on-board processor and one or more hardware platform control modules. The robotic software platform may include a robot operating system (ROS) to execute a robotic control algorithm and operate the robotic hardware platform to perform a bot-specific industrial task. A hardware processor module may interface with firmware of the one or more hardware platform control modules. A database may store operational data of the robotic hardware platform and the robotic software platform. A user interface module enables a user to remotely access and control the robot operating system. A payload stack may perform the bot-specific industrial task.

Various embodiments of the various aspects may be implemented. In some embodiments, the payload stack may include a chisel, a saw, a sweeper, a conveyor or a crusher. The industrial bot may be a digger bot, a crusher bot, a sweeper bot, a flotation bot, a shotcrete bot, a welder bot, a manipulator bot, a bolting bot, or a pump bot. According to another embodiment, bot-specific industrial task may include pre-conditioning rock, breaking rock, collecting excavated rock, filtering excavated rock, transporting excavated rock, applying cementitious material to a tunnel, reinforcement bolting a tunnel, or suctioning water from a tunnel. In some embodiments, a robotic control algorithm may include the steps of establishing autonomous communications with a second mining bot through a colony communications network, receiving a first data related to the collaborative industrial objective from a second industrial bot via the colony communications network and performing the bot-specific industrial task in response to receiving the first data, and performing the bot-specific industrial task based on the first data results in achieving the collaborative industrial objective. According to some embodiments, the industrial bot may be a digger bot, the second industrial bot is a sweeper bot, the first data relates to excavation and the collaborative industrial objective may include collecting rock excavated by the digger bot with the sweeper bot. According some embodiments, the industrial bot may be a digger bot, the second industrial bot may be a crusher bot, the first data relates to excavation and the collaborative industrial objective may include crushing rock excavated by the digger bot with the crusher bot.

BRIEF DESCRIPTION OF THE DRAWINGS

The foregoing and other features of the present development will become more fully apparent from the following description and appended claims, taken in conjunction with the accompanying drawings. Understanding that these drawings depict only several embodiments in accordance with the development and are not to be considered limiting of its scope, the development will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present development, as generally described herein, and illustrated in the figures, can be arranged, substituted, combined, and designed in a wide variety of different configurations, all of which are explicitly contemplated and make part of this disclosure.

DETAILED DESCRIPTION

Figure 1:
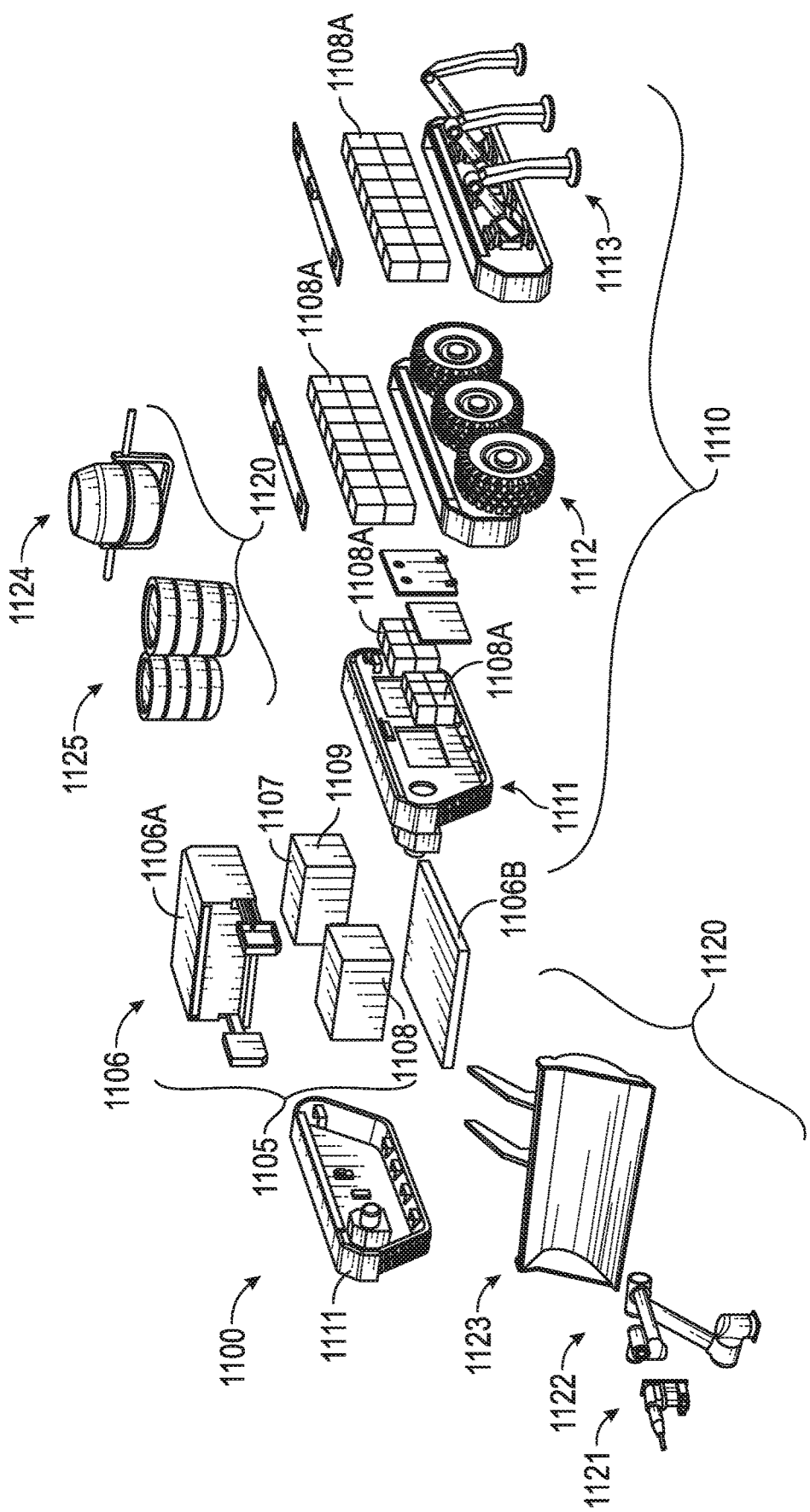
FIG. 1 is an exploded view of an embodiment of a modular industrial bot, including a universal platform, with various modular payload stacks and modular mobility systems that may be attached to and used with the universal platform.

The following detailed description is directed to certain specific examples of the development. Reference in this specification to "one example," "an example," or "In some implementations" means that a particular feature, structure, or characteristic described in connection with the example is included in at least one example of the invention. The appearances of the phrases "one example," "an example," or "In some implementations" in various places in the specification are not necessarily all referring to the same example, nor are separate or alternative examples necessarily mutually exclusive of other examples. Moreover, various features are described which may be exhibited by some examples and not by others. Similarly, various requirements are described which may be requirements for some examples but may not be requirements for other examples.

Various examples will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific examples of the development. Furthermore, examples of the development may include several novel features, no single one of which is solely responsible for its desirable attributes or which is essential to practicing the invention described herein.

The various industrial robotic platform systems and methods described herein may be used with, or use any of, the architectures and features described in the systems and methods described in U.S. Provisional Application No. 62/923,376, filed Oct. 18, 2019 and titled "Systems and Methods for Industrial Robotics," which is incorporated by reference herein in its entirety and forms a part of this specification for all purposes.

Each industrial robot or "bot" is configured for performing various industrial-specific tasks. The bots each include a universal platform with common structural, mechanical, electrical and/or computing systems, that is configured to be coupled with an interchangeable payload component and a mobility component. Each payload component is one among a plurality of different types of payload components that can each perform a unique industrial task. The payload component is integrated with the universal platform and configured for its particular specific industrial task to be performed by the bot. Each mobility component is one among a plurality of different types of mobility components that can each move the bot using a unique movement system. The bots include one or more processors in communication with one or more memories storing instructions thereon that when executed by the one or more processors perform the industrial task with the payload component. The task may be performed autonomously by the bot and/or in collaboration with other autonomous bots to achieve an overall collaborative industrial objective. The bots may include various hardware and software features, as described herein, that allow the bots to be used within an overall architecture or system for management and control of the bots.

The bots may be used to achieve an industrial objective. In some implementations, the bots may be used for mining where the bots are mining bots configured to achieve a mining objective. The bots may be used for construction, manufacturing, demolition, satellite swarms, fuel production, disaster recovery, communications, remote power, and others, deployed terrestrially on-land and underwater, in free space, on the Moon, Mars and other celestial bodies.

The bots may use a software-based approach to perform these and other industrial tasks using select combinations of the bots and supporting infrastructure. Each bot may be deployed to a particular site, working individually and/or in a collaborative fashion to perform related tasks to achieve a collaborative industrial objective, and intertwined with supporting communications and operating software and hardware infrastructure. The bots may be modular, swarm, small form-factor robots that may be mass produced and that allow for significant reduction in human participation in industrial tasks. The bots may be of any size. The bots may range from bacteria to Battlestar Galactica size.

A. Example Mining Bots—Example Modular Industrial Bots

FIG. 1 shows an example of a modular mining bot 1100. The mining bot 1100 may include a universal platform 1105. The universal platform 1105 may provide a single system having uniform structural, computing and support systems that is configured to couple with a variety of interchangeable payload stacks.

The universal platform 1105 may include a structural frame or platform 1106. The structural platform 1106 may include an upper enclosure 1106A and lower support frame 1106B with a variety of different mechanical and electrical mounting locations and configurations. The frame 1106B may support the various modules and other components of the universal platform, such as the universal bus, etc. The enclosure 1106A may house the various modules and components.

The universal platform 1105 may further include a data module 1107. The data module 1107 may include one or more buses and processors and memory system for storing instructions and one or more antennae and communication modules for communicating with other bots and/or other central or de-centralized control systems such as the colony control system. The various components of data module 1107 may include controllers in firmware for operating all modules connected with the mining bot 1100.

The universal platform 1105 may further include a power module 1108. The power module 1108 may include one or more of the following: a power supply (e.g., one or more batteries), a wiring and/or a power bus, a voltage or current converter module, controllers, and hardware to provide power to the various other modules of the bot 1100. The power module 1108 may also include a power supply 1108a. Optionally, the power supply 1108a may be mounted in conjunction with other modules of the universal platform 1105 such as within a mobility platform 1110.

The universal platform 1105 may include a thermal module 1109. The thermal module 1109 may be located with the data module, as shown, or separately or with other components of the platform. The thermal module 1109 may include one or more of the thermal management module or set of modules, such as a refrigeration or thermal sensor module. Optionally the module may include a heating module. The thermal module 1109 may generally function to manage a temperature of the mining bot 1100 which may include one or more heating or cooling components.

The universal platform 1105 may be connected with the mobility platform 1110. The mobility platform 1110 may be coupled with the structural platform 1106. Three different possible components for the mobility platform are shown. The mobility platform 1110 may comprise a tracked module 1111, a wheeled module 1112, and/or a legged module 1113. The completed track module 1111 with portions on both sides of the universal platform 1106 are shown. For clarity, only one side of the wheeled module 1112 and legged module 1113 are shown. Variously, each of the mobility modules may comprise any number of requisite tracks, wheels, or legs (or a hybrid of any of these systems) for providing mobility for the industrial bot. The mobility platform 1110 may allow any of the mobility modules 1111-1113 to be coupled with the structural platform 1106 providing mobility to the mining bot 1100. Accordingly, the structural platform 1106 may include requisite common mechanical and electrical connection points for installing the mobility modules.

The universal platform 1105 may comprise a robotic software platform. The robotic software platform may comprise of a controller layer having firmware configured to operate the universal and payload stacks using universal and payload control algorithms, etc., as described herein.

In certain implementations, the universal platforms 1105 may come in different sizes (e.g., a large, medium, or small size). The size utilized may depend on the application for the particular bot. The payload stack 1120 and the mobility platform 1110 may also come in different sizes and be interchangeable for each of the corresponding sizes of universal platforms 1105. Example sizes and ranges of sizes for the overall bot when assembled include lengths from about 1 foot to about 15 feet, widths from about 1 foot to about 10 feet, and heights from about 2 feet to about 10 feet. In some embodiments, the bots may be from about 5-7 feet long, and/or 3-5 feet wide, and/or 2-4 feet tall.

The mining bot 1100 may include a payload stack 1120. The payload stack 1120 may include one or a set of payload tools for performing specific industrial tasks. The payload tools may be used for achieving industrial objectives such as specific mining tasks (e.g., excavating, sweeping, etc.). The payload stack 1120 may be integrated in various areas of the universal platform 1105. For example, in some implementations components of the payload stack may be coupled with the structural platform 1106 on the front rear top, bottom, or sides thereof. Optionally, one or more of the components of the payload stack 1120 may be coupled with the mobility platform 1110 or any of the modules thereof. As shown in certain examples, the payload stack 1120 may include a digger module 1121 including a digging tool (e.g., a robotic chisel, robotic saw, robotic drill, etc.), a robotic arm module 1122 including articulable joint and connecting linkages, a dozer module 1123 including a blade and lift mechanism, a mixer module 1124 (e.g., for cementious mixtures) including a vessel that may be rotatable, and/or a fluid container module 1125 including a fluid carrying vessel.

The payload stack 1120 may be selected in accordance with the specific industrial tasks that are performed by the specific mining bot 1100. The following examples of mining bots shown in and described with respect to FIGS. 2A-9C may each include a universal platform 1105 and carry a different payload stack 1120 selected from a plurality of different payload stack types. In addition, the mining bots may also vary in the selected mobility platform 1110 and/or other of the above modules selected respectively from a plurality of mobility platform types and a plurality of module types.

Figure 2A:
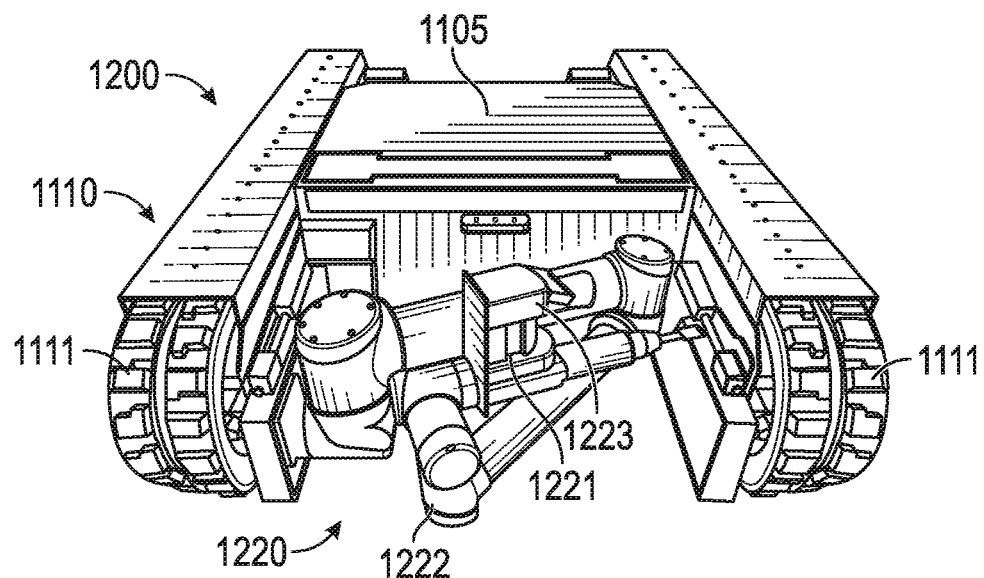
FIGS. 2A-2B are front perspective views of an embodiment of a digger bot showing, respectively, tool arms stowed and deployed.

FIG. 2A shows an embodiment of a digger bot 1200. The digger bot 1200 includes the universal platform 1105. As shown, the universal platform 1105 is attached with the mobility platform 1110. The mobility platform 1110 is implemented as the tracked module 1111, shown as a two-track system. The digger bot 1200 may include a digger payload stack 1220. The digger payload stack 1220 may include a digger tool 1221, the digger tool 1221 may comprise a robotic rock removal tool. The robotic rock removal tool may be a drill or a chisel or similar tools for mechanically breaking rock (e.g., from a rock face). The digger tool 1221 may be electric, pneumatic or otherwise powered. The digger tool 1221 may provide reciprocating action to the drill or the chisel tip.

The digger payload stack 1220 may further include a robotic arm 1222. The digger tool 1221 may be mounted on the robotic arm 1222. The robotic arm 1222 may comprise a plurality of articulable joints and linkages. The joints of the robotic arm 1222 may include servo-actuated rotational or translational joints. The robotic arm 1222 may be mounted on the universal platform 1105.

The digger payload stack 1220 may further include a sensor 1223. The sensor 1223 may be an optical, infrared, laser or any other type of sensor. The sensor 1223 may be used for mapping the rock face or other environmental features. The sensor 1223 may be used in conjunction with the machine learning algorithms for facilitating the removal of excavation of the rock face using the digger tool 1221.

Figure 2B:
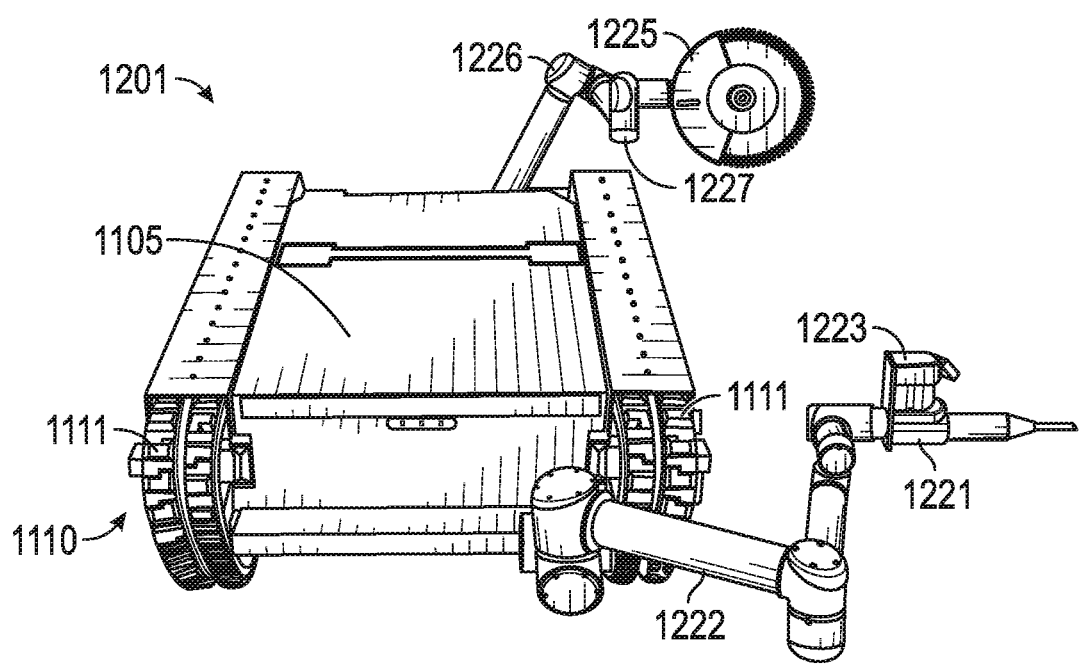

In certain embodiments of the bot including the digger payload stack 1220, only the single robotic arm 1222 and the digger tool 1221 may be included. Another embodiment of a digger bot 1201 is shown in FIG. 2B, where the digger payload stack 1220 may further include a cutter tool 1225. The cutter tool 1225 may include a reciprocating or rotating blade for cutting into the rock face and breaking the rock thereof. The cutter tool 1225 may be powered by an electric motor or other type of actuator. The cutter tool 1225 being mounted on a robotic arm 1226. The robotic arm 1226 may include a plurality of joints and linkages for articulating the position of the cutter tool 1225. The digger payload stack 1220 may be used for bot-specific industrial tasks that include pre-conditioning rock or concrete or any other construction material and breaking rock, concrete or any other construction material.

The digger payload stack 1220 may also include a second sensor 1227. The second sensor 1227 may be mounted on the second robotic arm 1226. Similar to the first sensor 1223, the second sensor 1227 may be used for mapping the rock face and controlling the cutter tool 1225. Optionally the sensors 1223/1227 may be mounted directly on another portion of the universal platform 1105.

Figure 3A:
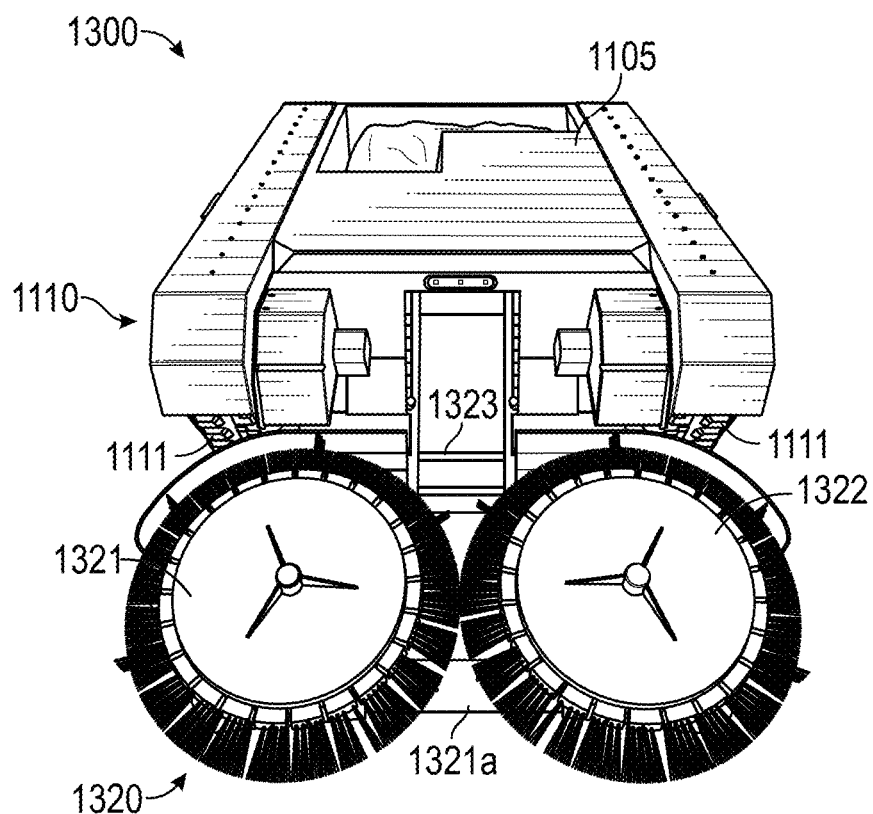
FIGS. 3A-3C are various perspective views of an embodiment of a sweeper/crusher bot and components thereof.
Figure 3B:
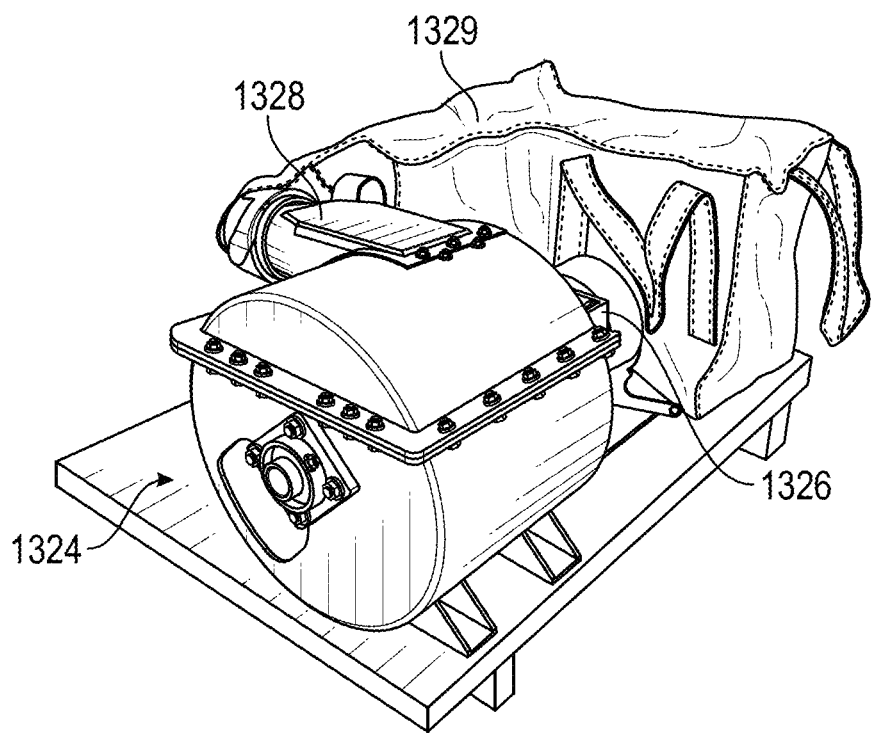
Figure 3C:
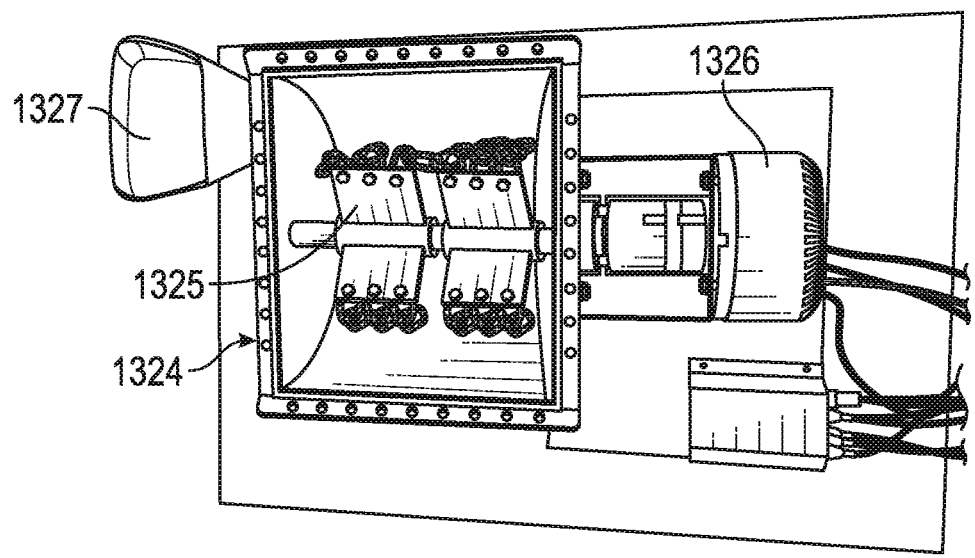

FIGS. 3A-3C show an example of a sweeper bot 1300 and components thereof. The sweeper bot 1300 may include the universal platform 1105. The sweeper bot 1300 may include the mobility platform 1110. The mobility platform 1110 may include the tracked module 1111. The track module 1111 may extend along and surround rotating wheels or pulleys to propel the bot 1300 forward and backward. The sweeper bot 1300 may include a sweeper payload stack 1320. The sweeper payload stack 1320 may collect loose materials such as excavated rock. The rock may be material that has been excavated from the rock face by the digger bot 1200.

The sweeper payload stack 1320 may include a first sweeper 1321. The first sweepers 1321 may be mounted on a scraper or ramp 1321a. The ramp 1321a may be a generally planar member. The ramp 1321a may be oriented downward at an angle and to contact with a ground surface. The sweeper 1321 may include a plurality of outwardly oriented brush members. The sweeper 1321 may rotate to sweep material onto the ramp 1321a. The sweeper 1321 may rotate in a counterclockwise direction. The sweeper payload stack 1320 may include a second sweeper 1322. The second sweeper 1322 may be mounted on the ramp 1321a opposite the first sweeper 1321. The second sweeper 1322 may rotate in a clockwise direction to generally sweep material between the first and second sweepers 1321, 1322.

The sweeper payload stack 1320 may include a conveyor 1323. The conveyor 1323 may be located generally between the first and second sweepers 1321, 1322. The conveyor 1323 may include a belt mounted on one or more rollers for gathering the swept rock material from the ramp 1321a and depositing it inside a receptacle. The receptacle may be located on or in the sweeper bot 1300. The sweeper payload stack 1320 may be used in conjunction with the digger bot 1200 for excavating purposes. The sweeper payload stack 1320 may be used for bot-specific industrial tasks that include collecting excavated rock, concrete or any other construction material and transporting excavated rock, concrete or any other construction material.

As shown in FIG. 3A, the sweeper payload stack 1320 may further include a crusher 1324. Alternatively, the crusher 1324 may be mounted on a separate mining bot from the sweeper bot 1300 (e.g., a dedicated crusher bot). The gathered rock material may be conveyed into the crusher 1324 by the conveyor 1323. The rock material may be received within an inlet 1327 into a chip entrainment drum of the crusher 1324. The chip entrainment drum may include an outlet 1328. The outlet 1328 may connect with a material bag 1329. The crusher 1324 may include an internal rotor 1325. The rotor 1325 may be rotatably mounted and powered by a motor 1326. The rotor 1325 may include one or more grinding or crushing elements for crushing the contents of the crusher 1324. The crusher 1324 may pulverize the rock fragments into smaller pieces by rotation of the rotor 1325. The crushed material of the crusher 1324 may be blown into the material collection bag 1329. The crusher payload stack may be used for bot-specific industrial tasks that include filtering/concentrating excavated rock.

Figure 4A:
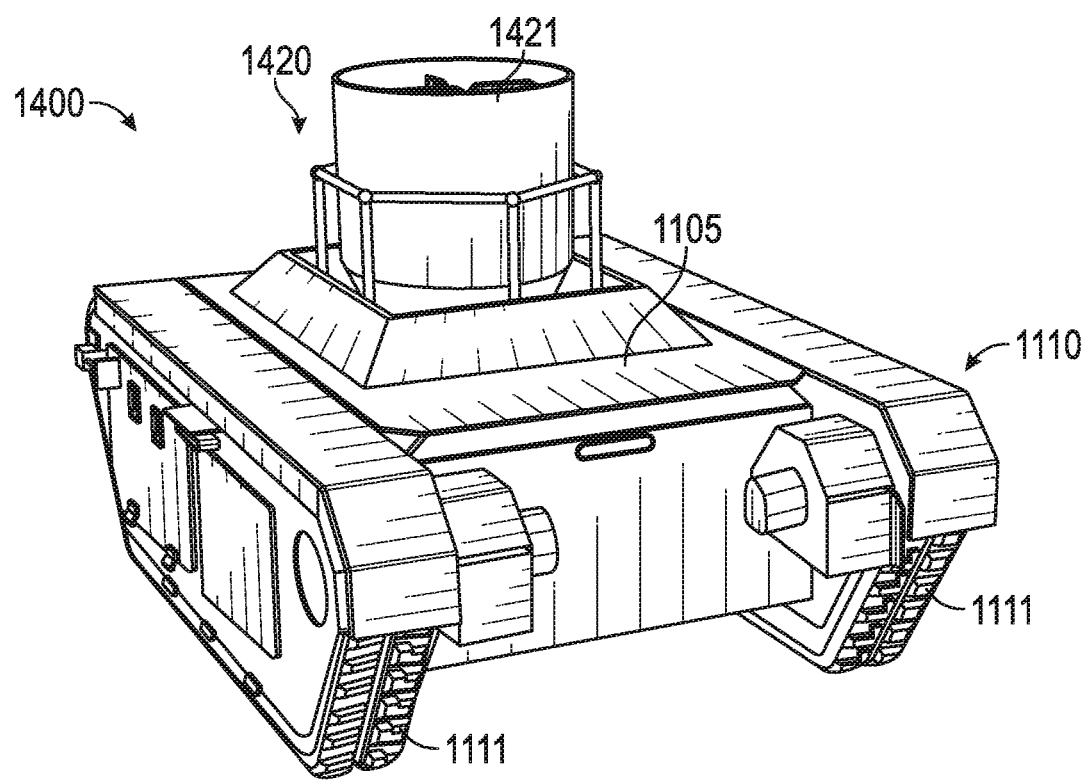
FIGS. 4A and 4B are, respectively, perspective views of an embodiment of a flotation bot and a suction bot.

FIG. 4A shows a flotation bot 1400. The flotation bot 1400 may include the universal platform 1105 and the mobility platform 1110. The flotation bot 1400 may include the tracked module 1111. The flotation bot 1400 may further include a flotation payload stack 1420. The flotation payload stack 1420 may include a flotation unit 1421. The flotation unit 1421 may be used for separating crushed rock material into target materials and undesirable materials. Crushed rock materials may be received within the flotation payload stack 1420. The crushed rock material may then be pumped through the flotation unit 1421 via a hose. The flotation unit 1421 may separate the desirable and undesirable materials. The desirable materials may be transmitted along a first pipe or hose. The undesirable materials may be transmitted along another pipe or hose. The flotation payload stack 1420 may transmit waste or undesirable material such as to another location or area within the mine. The flotation payload stack 1420 may be used for bot-specific industrial tasks that include filtering/concentrating excavated rock.

Figure 4B:
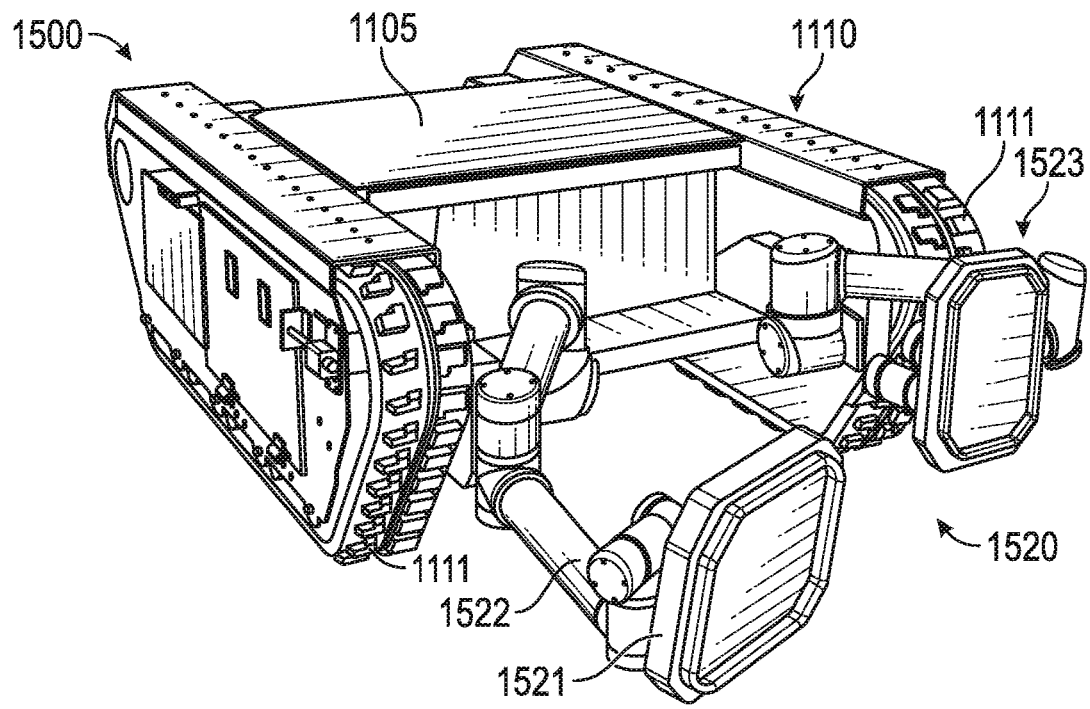

FIG. 4B shows an example of a suction bot 1500. The suction bot 1500 may include the universal platform 1105. The suction bot 1500 may include the mobility platform 1110. The mobility platform may include the tracked module 1111. The suction bot 1500 may further include a suction payload stack 1520. The suction payload stack 1520 may include a suction member 1521. The suction member 1521 may be mounted to a robotic arm 1522. The robotic arm 1522 may comprise a plurality of joint and linkages for articulating and manipulating the position of the suction member 1521. Optionally, a second suction member and/or robotic arm 1523 may be included. The suction payload stack 1520 may be used to transport and/or lift material (e.g., concrete slabs). The suction bot 1500 for example may raise tools or materials into position for being secured therein. For example, they may raise reinforcing materials that may then be secured in place by other types of bots in a repair squad. As a part of the demolition squad the suction bot 1500 may sweep and haul away materials that are undesirable to have inside of the operating area. The suction payload stack 1520 may be used for bot-specific industrial tasks that include suctioning or supporting rock, concrete or any other construction material.

Figure 5A:
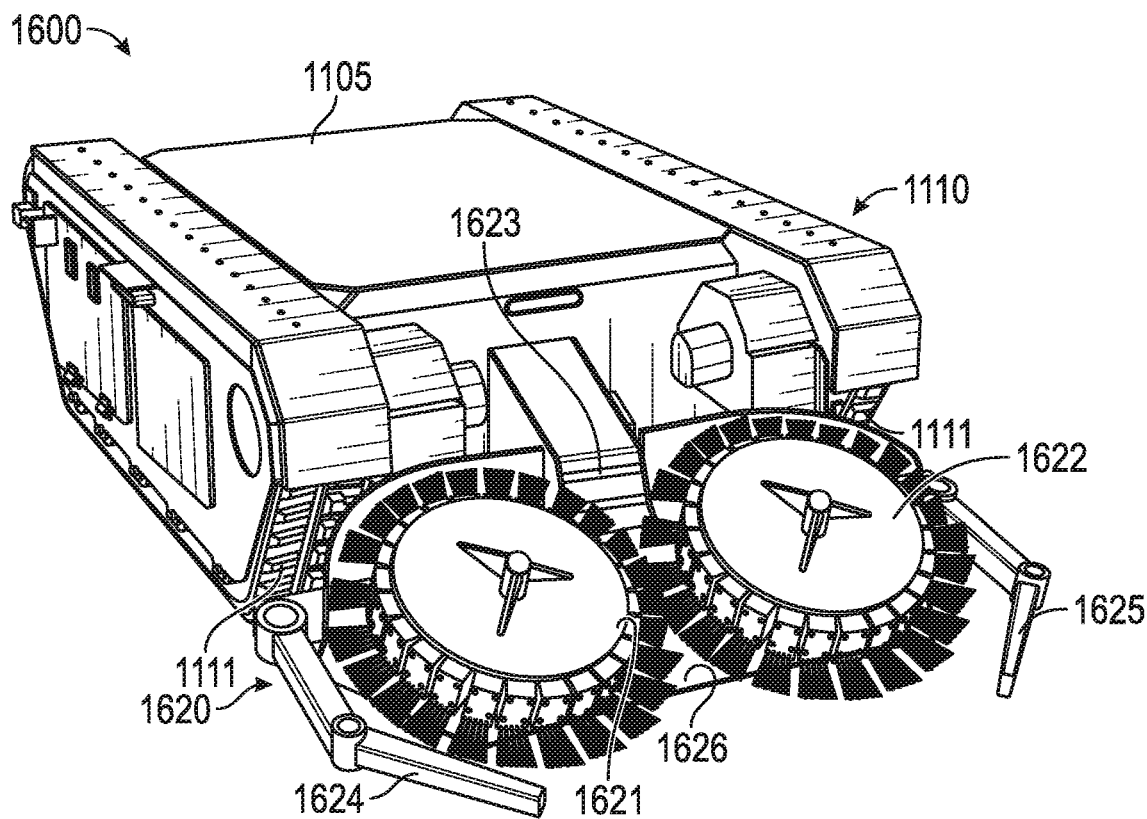
FIGS. 5A-5D show, respectively, perspective views of embodiments of a sweeper/crusher bot, a shotcrete bot, a bolting bot, and a welding bot.

FIG. 5A shows another example of a sweeper bot 1600. The sweeper bot 1600 may include the universal platform 1105. The sweeper bot 1600 may include a mobility platform 1110 and/or the tracked module 1111. The sweeper bot 1600 may include a sweeper payload stack 1620. The sweeper payload stack 1620 may be identical to the sweeper payload stack 1320, with the following features: a first sweeper member 1621, a second sweeper member 1622 a scraper 1626 on which the first and second sweeper members 1621. 1622 are mounted, and/or a conveyor 1623 coupled with the scraper 1626 between the first and second sweeper member 1621, 1622. The sweeper payload stack 1620 may further include a first arm 1624. The first arm 1624 may include plurality of linkages and joints. The first arm 1624 may be mounted on the scraper 1626. The first arm 1624 may be generally be articulable to retrieve materials and push them into the first sweeper 1621. A distal end of the first arm 1624 may extend outward from the sweeper 1621, gather material, and push it into the bristles of the sweeper 1621. This may facilitate faster and more efficient recovery of materials into the conveyor 1623. Similarly, the second side may include a second robotic arm 1625 that operates similar to the first robotic arm with respect to the second sweeper 1622.

Figure 5B:
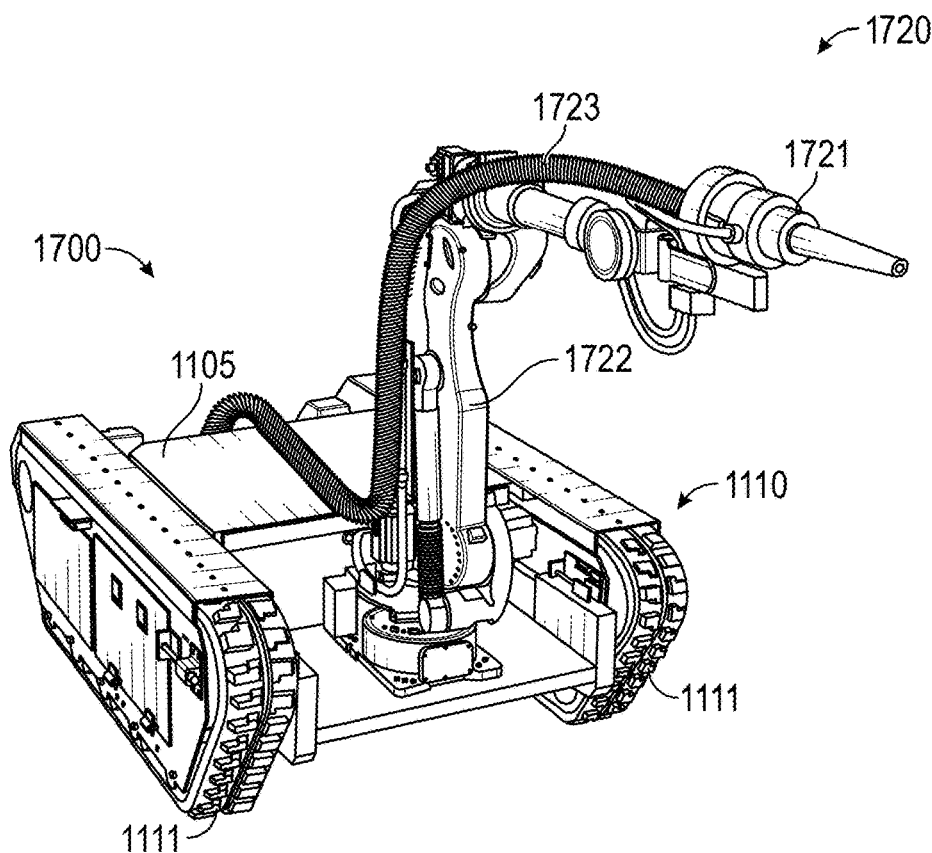

FIG. 5B shows an example of a shotcrete bot 1700. Shotcrete may comprise a sprayed concrete compound or other sprayed hardening compound. The shotcrete bot 1700 may include the universal platform 1105. The shotcrete bot 1700 may include the mobility platform 1110 and/or the tracked module 1111. The shotcrete bot 1700 may include a shotcrete payload stack 1720. A shotcrete payload stack may include a nozzle 1721 for spraying the shotcrete compound. The nozzle 1721 may be controllable by a robotic arm 1722 including a plurality of joint and linkages. The shotcrete payload stack 1720 may further include a supply hose 1723. The supply hose 1723 may be coupled with a reservoir of the shotcrete compound either on the shotcrete bot 1700 or on another bot or other supply source through the supply hose 1723. The shotcrete payload stack 1720 may generally be used for construction such as applying cementitious material to a mine section (for example panel or tunnel). The shotcrete payload stack 1720 may form part of a tunneling/repair squad or other type of squad. The shotcrete payload stack 1720 may be used for bot-specific industrial tasks that include applying cementitious material to supporting rock, concrete or any other construction material, reinforcing rebar, and applying passivating coating.

Figure 5C:
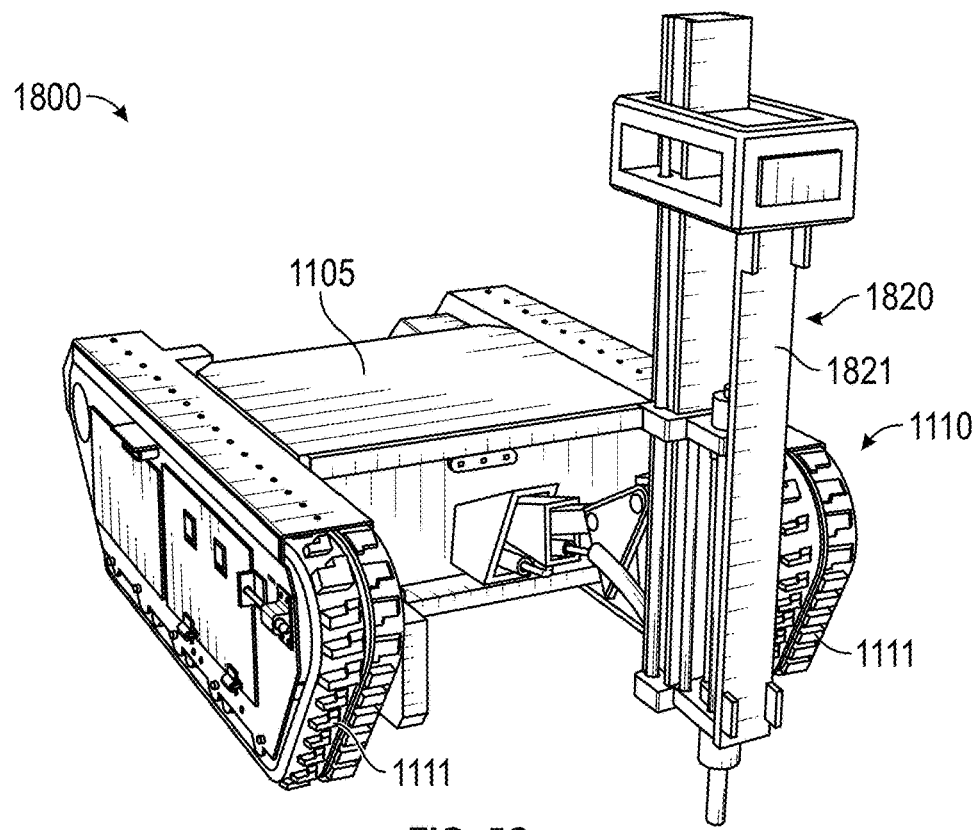

FIG. 5C shows an example of a bolting bot 1800. The bolting bot 1800 may include the universal platform 1105. The bolting bot 1800 may include the mobility platform 1110 and/or the tracked module 1111. The bolting bot 1800 may include a bolt payload stack 1820. The bolt payload stack 1820 may include a bolt inserter 1821. The bolt inserter 1821 may comprise a magazine of mechanical fasteners such as bolts, screws, nails, anchors, or the like. The mechanical fasteners may be fed into an actuator by the magazine. The actuator may apply a force to the fasteners for inserting the fasteners into a substrate. The bolt inserter 1821 may be articulable via a robotic arm and may comprise one or more joints and linkages. The bolting bot 1800 may form part of a tunneling or repair robotic squad or other type of squads. The bolt payload stack 1820 may generally be used to insert reinforcement bolting a mine section (for example panel or tunnel). The bolting payload stack 1820 may be used for bot-specific industrial tasks that include reinforcement bolting of supporting rock, concrete or any other construction material.

Figure 5D:
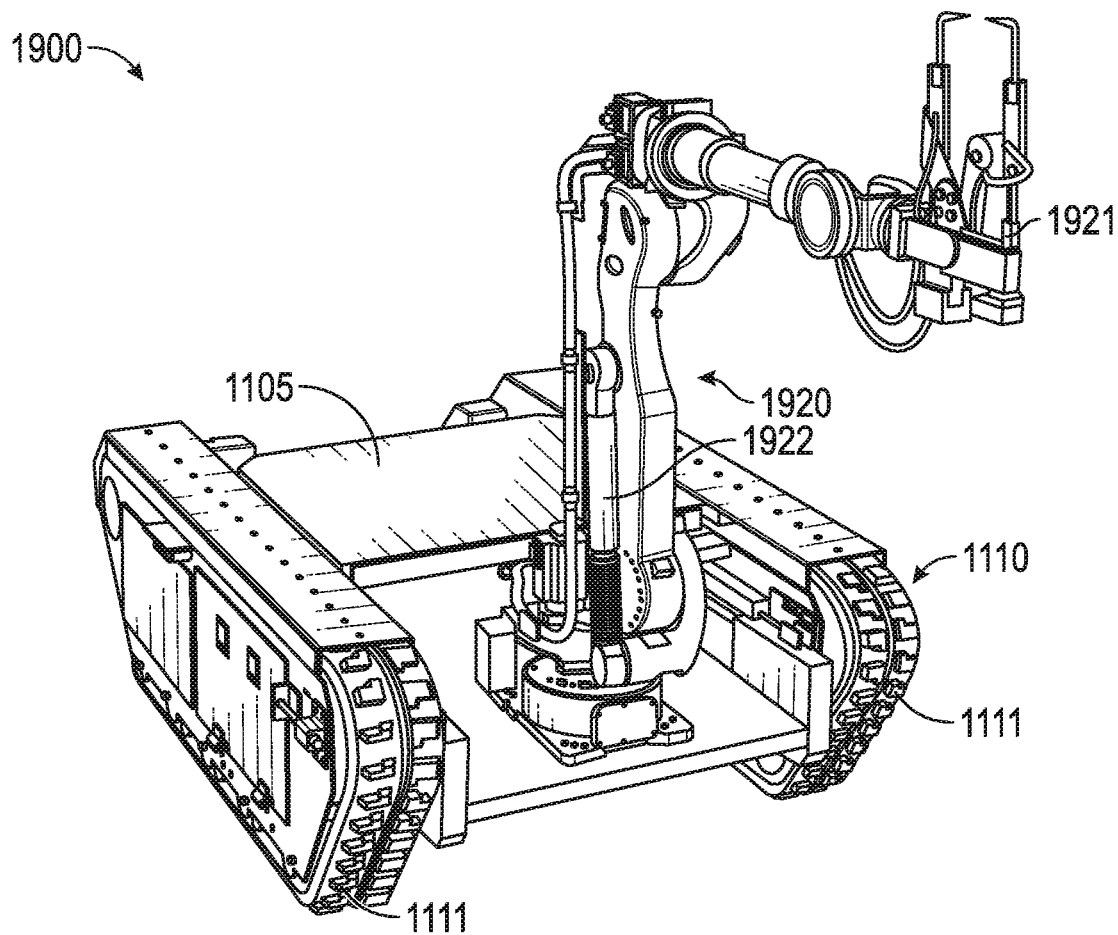

FIG. 5D shows an example of a welding bot 1900. The welding bot 1900 may include the universal platform 1105. The welding bot 1900 may include the mobility platform 1110 and/or the tracked module 1111. The welding bot 1900 may include a welding payload stack 1920. The welding payload stack 1920 may include a weld head 1921. The weld head 1921 may comprise one or more welding members that are powered by an electrical source and connected thereto with one or more wires. The weld head 1921 may be articulable by a robotic arm 1922. The robotic arm 1922 may comprise one or more joints and linkages for manipulating the position of the weld head 1921. The welding payload stack 1920 may function as a welding unit for connecting to metallic materials. The welding bot 1900 may form part of tunneling, repair or similar types of robotic squads. The welding payload stack 1920 may be used for bot-specific industrial tasks that include welding or repairing and reinforcing rebar or tunnel support materials.

Figure 6A:
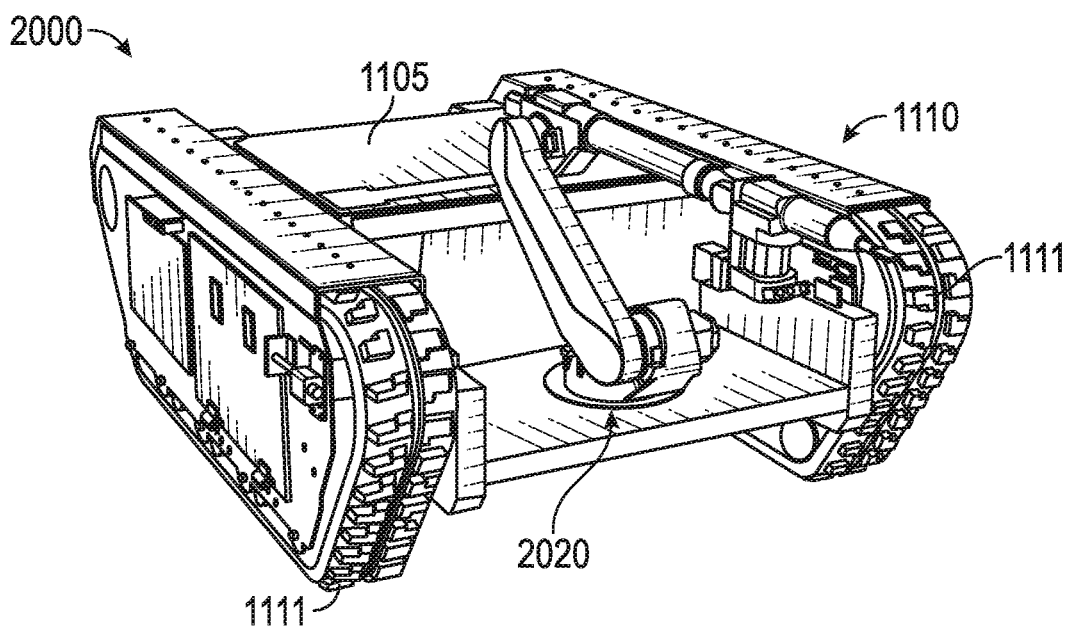
FIG. 6A-6C are perspective views of an embodiment of a digger bot having, respectively, a tracked, wheeled, and legged mobility system.
Figure 6B:
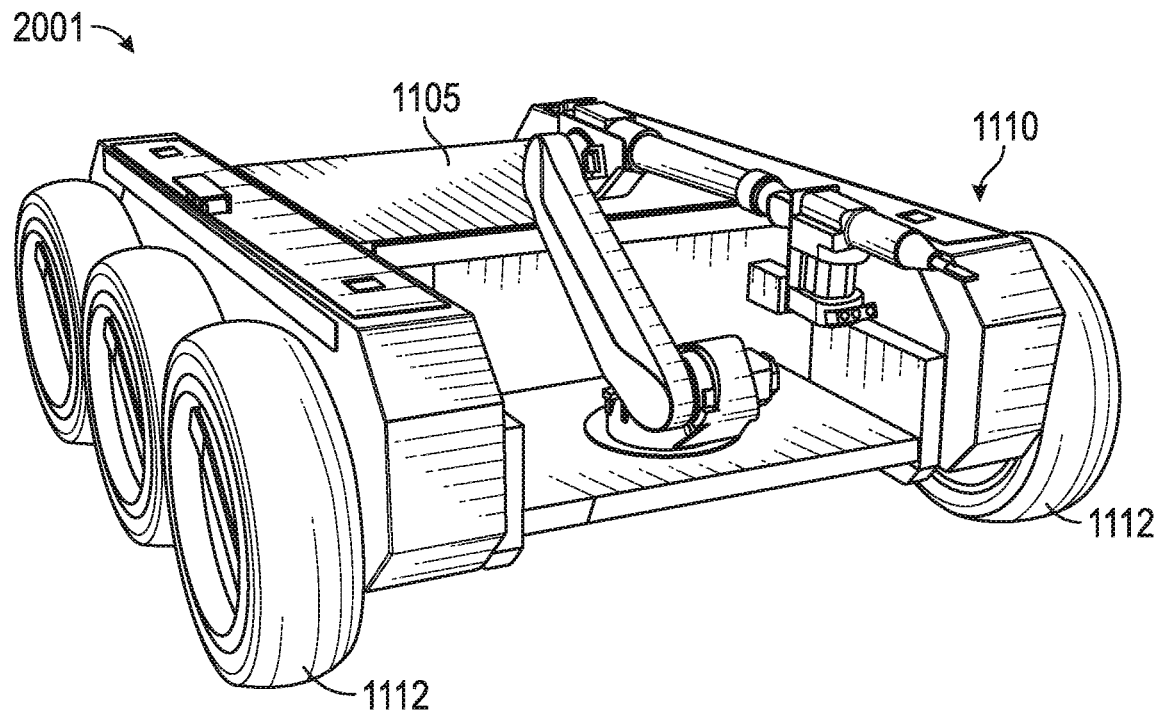
Figure 6C:
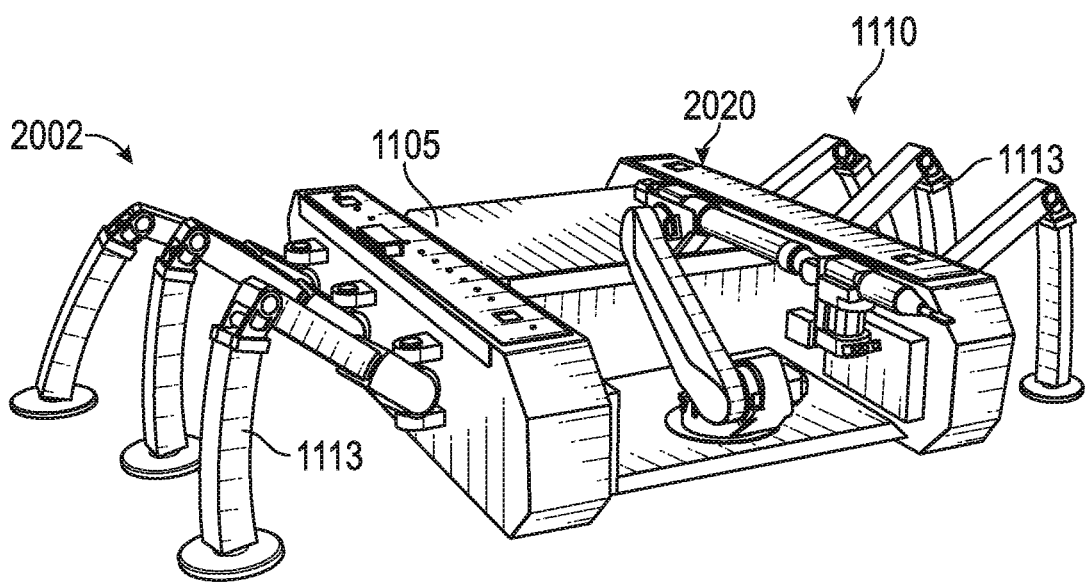

FIGS. 6A-6C show, respectively, three different embodiments of digger bots 2000, 2001, 2002. The digger bots 2000, 2001, 2002 may include the universal platform 1105 and the mobility platform 1110. The digger bots 2000, 2001, 2002 may include a digger payload stack 2020. The digger payload stack 2020 may include excavating tools such as those described above. The digger bot 2000, as shown in FIG. 6A, may have the mobility platform 1110 that includes the tracked module 1111. The digger bot 2001, as shown in FIG. 6B, may have the mobility platform 2010*b* that includes the wheeled module 1112. In the example shown, each side of the wheeled module 1112 includes three wheels. The digger bot 2002, as shown FIG. 6C, may include the mobility platform 1110 that includes the legged module 1113. Each side of the legged module 1113 includes three legs that may be articulated to provide mobility to the digger bot 2002. Each of the different mobility modules of the mobility platform 1110 may be interchangeable with the same universal platform 1105 and the digger payload stack 2020.

Figure 7A:
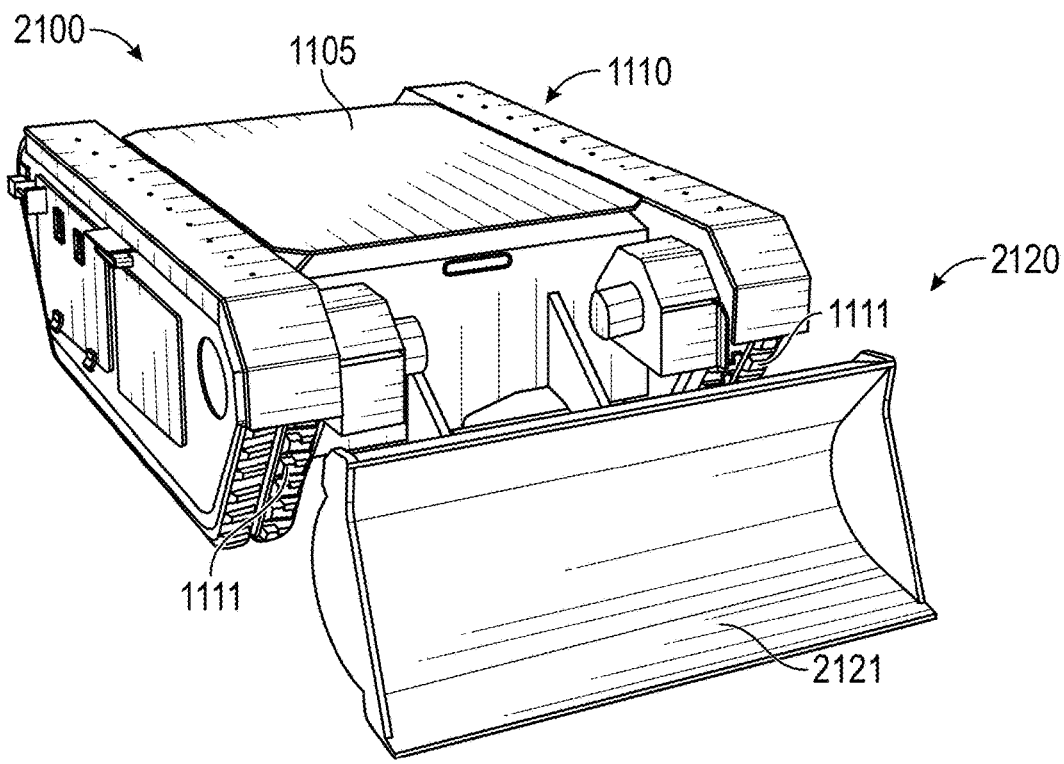
FIGS. 7A-7D are, respectively, perspective views of an embodiment of a dozer bot, a suction bot, 3D construction bot, and a manipulator bot.

FIG. 7A shows an example of a dozer bot 2100. The dozer bot 2100 may include the universal platform 1105. The dozer bot 2100 may include the mobility platform 1110 and/or the tracked module 1111. The dozer bot 2100 may include a dozer payload stack 2120. The dozer payload stack 2120 may include a blade and/or lift module 2121. The dozer payload stack 2120 may be generally used for moving loose materials such as crushed rock. The dozer payload stack 2120 may be used in various robotic squads such as tunneling, demolition, repair, and clean-up squads.

Figure 7B:
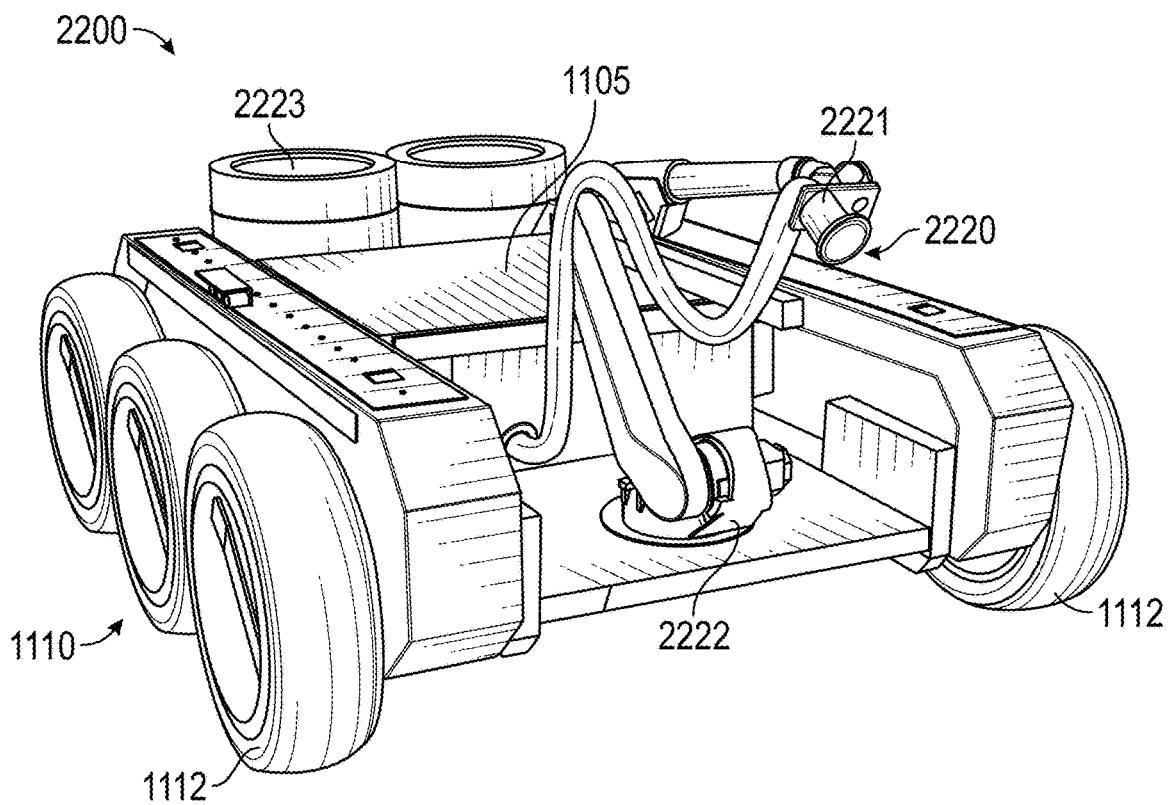

FIG. 7B shows an embodiment of a pump bot 2200. The pump bot 2200 may include the universal platform 1105. The pump bot 2200 may include the mobility platform 1110 having wheeled module 1112. The pump bot 2200 may include a fluid payload stack 2220. The fluid payload stack 2220 may include a suction nozzle 2221. The fluid payload stack 2220 may include a robotic arm 2222. The suction nozzle 2221 may be mounted on the robotic arm 2222. The fluid payload stack 2220 may include one or more reservoirs 2223. The reservoirs 2223 may be coupled with the hose attached with the suction nozzle 2221 and use the suction nozzle 2221 may suck up fluids into the fluid reservoirs 2223. Alternatively, or in addition, the suction nozzle 2221 may be a spray nozzle. The fluid payload stack 2220 may be used in various robotic squads such as tunneling, demolition, repair, and clean-up squads. The fluid payload stack 2220 may be used for suctioning water from a mine section (for example stope or tunnel). In another implementation, the pump bot 2200 may be configured as a sandblaster & sprayer bot (not shown). The sandblaster & sprayer bot may include a nozzle configured for spraying a substance to aid in the excavation, cleanup, or other mining-related tasks. The fluid payload stack 2220 may be used for bot-specific industrial tasks that include suctioning or pumping water, cleaning, and applying passivating coating.

Figure 7C:
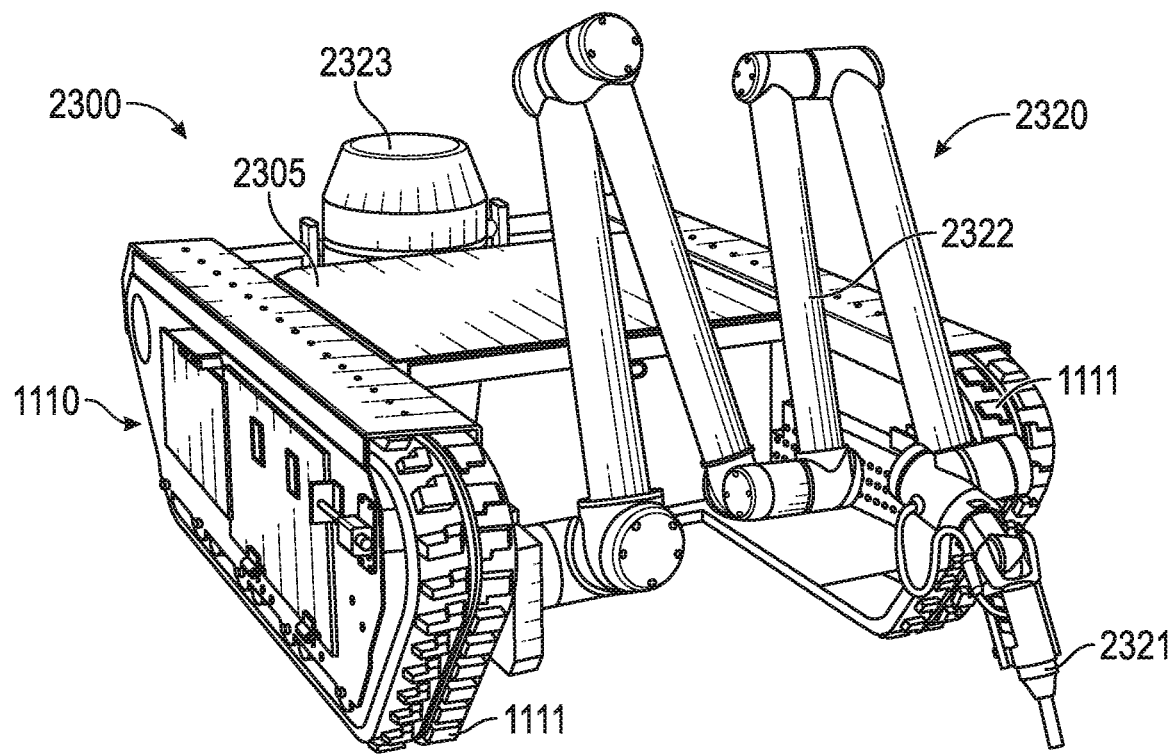

FIG. 7C shows a 3D construction bot 2300. The 3D construction bot 2300 may include the universal platform 1105. The 3D construction bot 2300 may include the mobility platform 1110 and/or the tracked module 1111. The 3D construction bot 2300 may include a 3D construction payload stack 2320. The 3D construction payload stack 2320 may include a nozzle 2321. The nozzle 2321 may be mounted on a robotic arm 2322. The robotic arm 2322 may comprise one or more joints and linkages for moving the nozzle 2321. A hose may extend along the robotic arm 2322 and couple with the nozzle 2321. The hose may be coupled with a 3D compound reservoir 2323. The reservoir 2323 may be coupled with a pump for pumping a 3D construction compound to the nozzle 2321. The 3D construction compound may be a cement, polymer or other type of compound used for construction of new materials, filling in gaps, application of adhesives, and similar activities. The 3D construction bot 2300 may be used in various robotic squads such as tunneling and repair squads. The 3D construction payload stack 2320 may be used for bot-specific industrial tasks that include applying cementitious material or reinforcement to supporting rock, concrete or any other construction material.

Figure 7D:
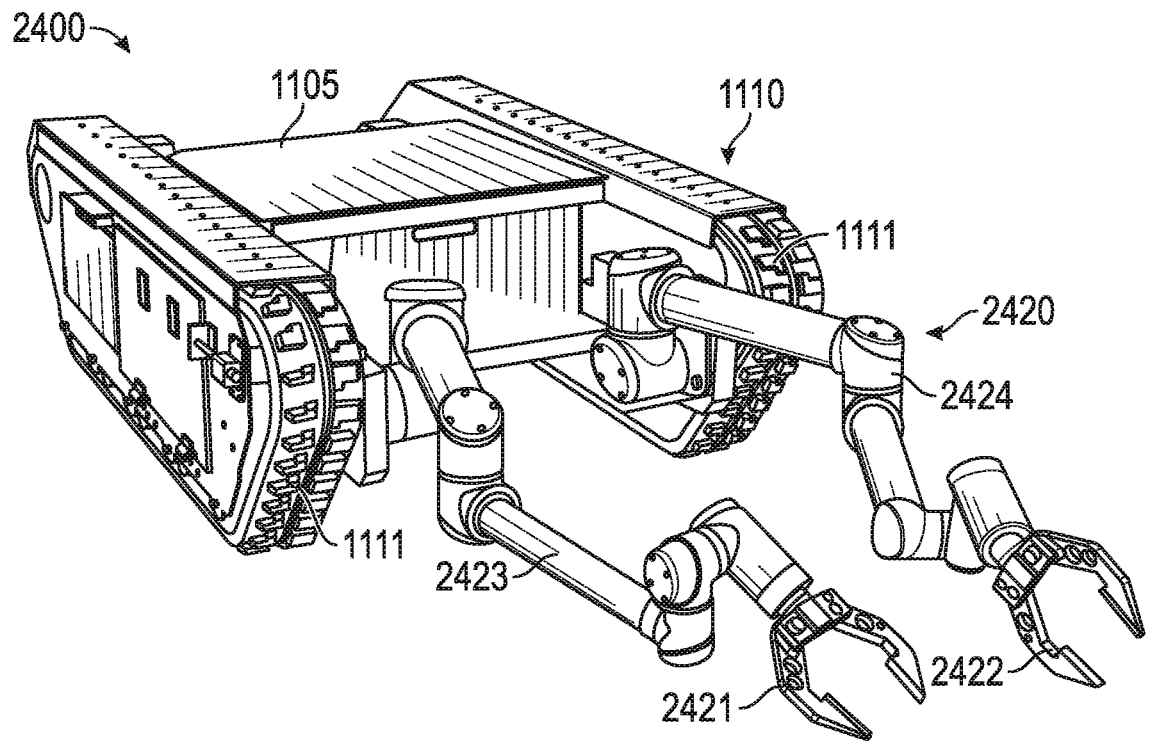

FIG. 7D shows an example of a manipulator bot 2400. The manipulator bot 2400 may include the universal platform 1105. The manipulator bot 2400 may include the mobility platform 1110 and/or tracked module 1111. The manipulator bot 2400 may include a repair payload stack 2420. The repair payload stack 2420 may include a robotic manipulator 2421. The robotic manipulator 2421 may include one or more articulable members such as a clamping mechanism for grasping an manipulating other objects. The robotic manipulator 2421 may be coupled with a robotic arm 2423. The robotic arm 2423 may include a plurality of joints and linkages for moving the robotic manipulator 2421. Optionally, the repair payload stack 2420 may include second robotic manipulator 2422 and robotic arm 2424. The manipulator bot 2400 may be used in various robotic squads such tunneling, demolition, repair, and clean-up squads. The repair payload stack 2420 may be used for bot-specific industrial tasks that include cleaning, repairing, reinforcing rebar and removing corrosion.

Figure 8A:
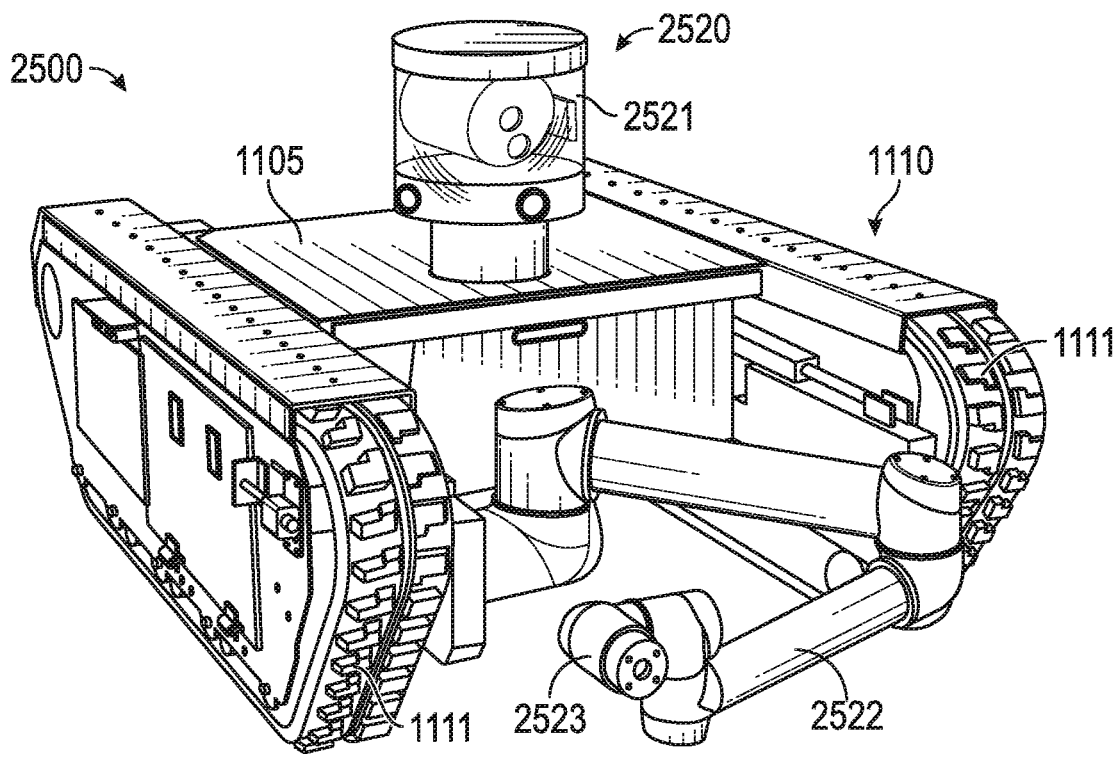
FIGS. 8A-8C show perspective views of another example of a survey bot with a survey module and having, respectively, a tracked, wheeled, and legged mobility system.
Figure 8B:
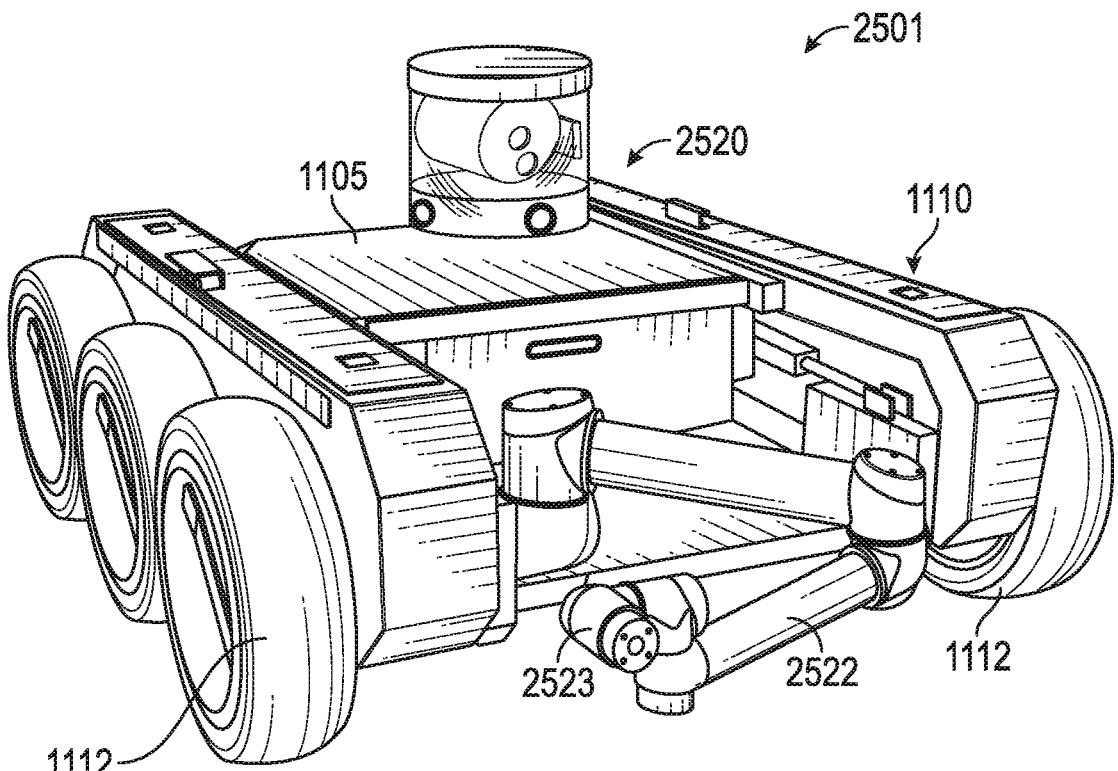
Figure 8C:
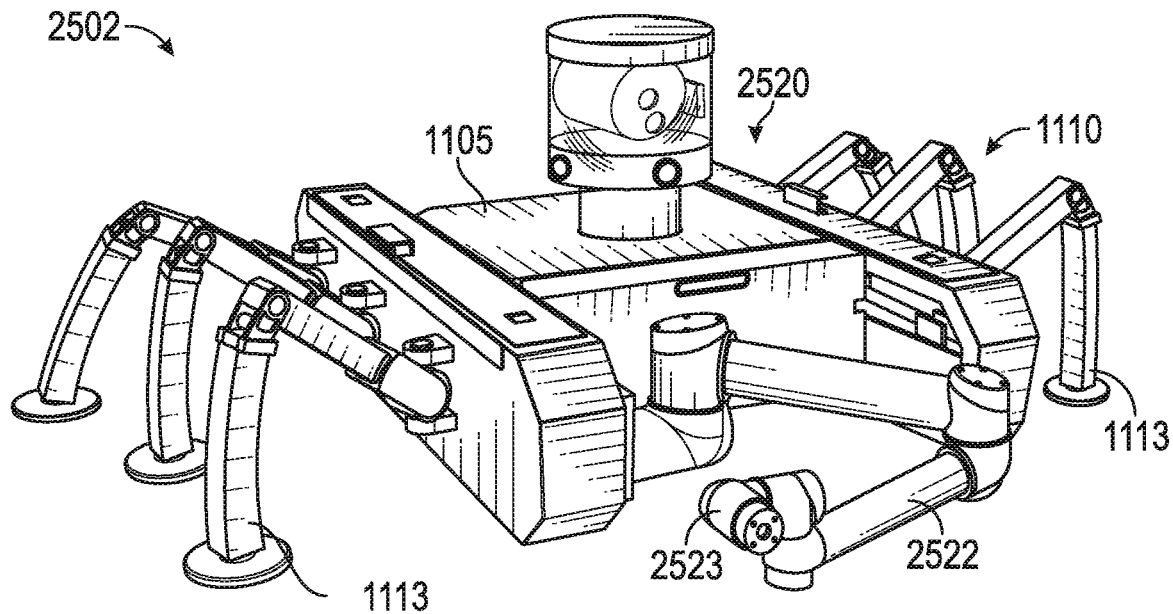

FIGS. 8A-8C show, respectively, example embodiments of survey bots 2500, 2501, 2502. The survey bots 2500, 2501, 2502 may include the universal platform 1105 and the mobility platform 1110. The survey bots 2500, 2501, 2502 may include a survey payload stack 2520. The survey payload stack 2520 may include a survey module 2521. The survey module 2521 may include one or more sensors such as lasers, infrared, GPS or similar for performing survey tasks. The survey payload stack 2520 may further include a robotic arm 2522. The robotic arm 2522 may include an end effector 2523. The end effector 2523 may include a positioning system wherein the end of the end effector 2523 may be used for taking measurements of other objects and environments in conjunction with these survey tasks of the survey bot 2500. FIG. 8A shows the survey bot 2500 with the mobility platform 1110 including the tracked module 1111. FIG. 8B shows the survey bot 2501 with the mobility platform 1110 including the wheeled module 1112. FIG. 8C shows the survey bot 2502 with the mobility platform 1110 having the legged module 1113.

Figure 9A:
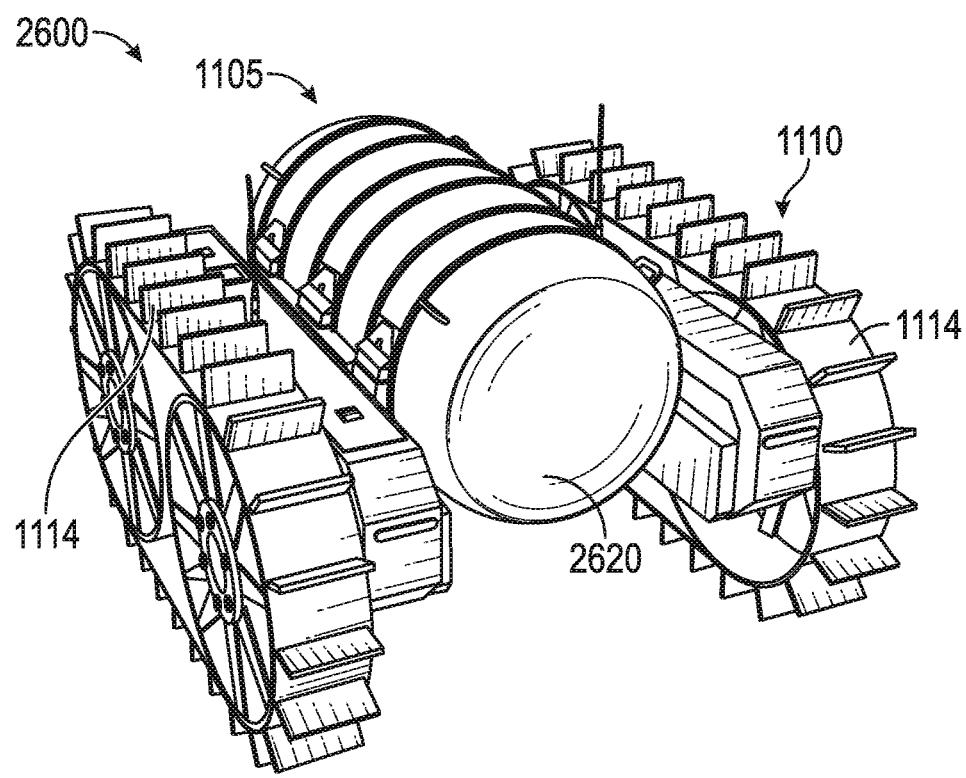
FIGS. 9A-9C are, respectively, perspective views of embodiments of a lunar tanker bot, a lunar dozer bot, and a lunar digger bot.

FIG. 9A shows an example of a lunar tanker bot 2600. The lunar tanker bot 2600 may include the universal platform 1105. The lunar tanker bot 2600 may include the mobility platform 1110. The mobility platform 1110 may include lunar tracked module 1114 including a pair of tracks having a plurality of flanges extending therefrom and configured for use in a lunar environment. The lunar tanker bot 2600 may include a fluid payload stack 2620, similar to the fluid payload stack 2220.

Figure 9B:
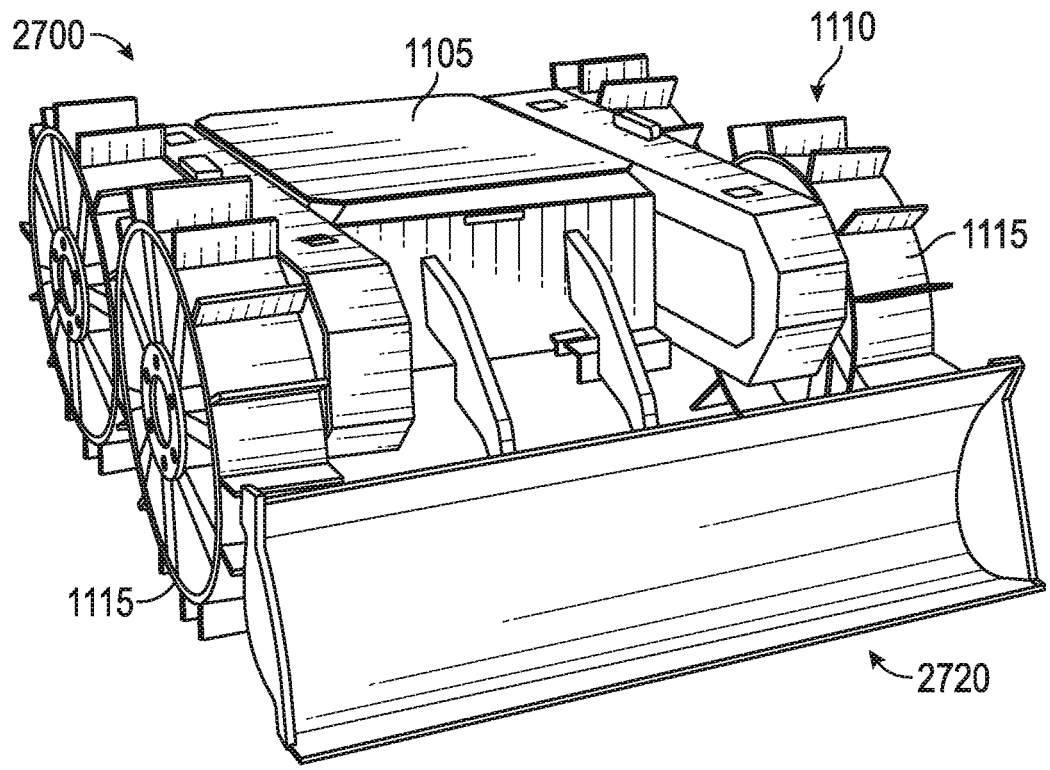

FIG. 9B shows an example of a lunar bulldozer 2700. The lunar bulldozer 2700 may include the universal platform 1105. The lunar bulldozer 2700 may include the mobility platform 1110. The mobility platform 1110 may include a lunar wheeled module 1115 having one or more wheels on each side. The wheels may include flanges that extend outwardly from a center radius. The wheels may be designed for use on the surface of the moon. The lunar bulldozer 2700 may include a dozer payload stack 2720, similar to the dozer payload stack 2120.

Figure 9C:
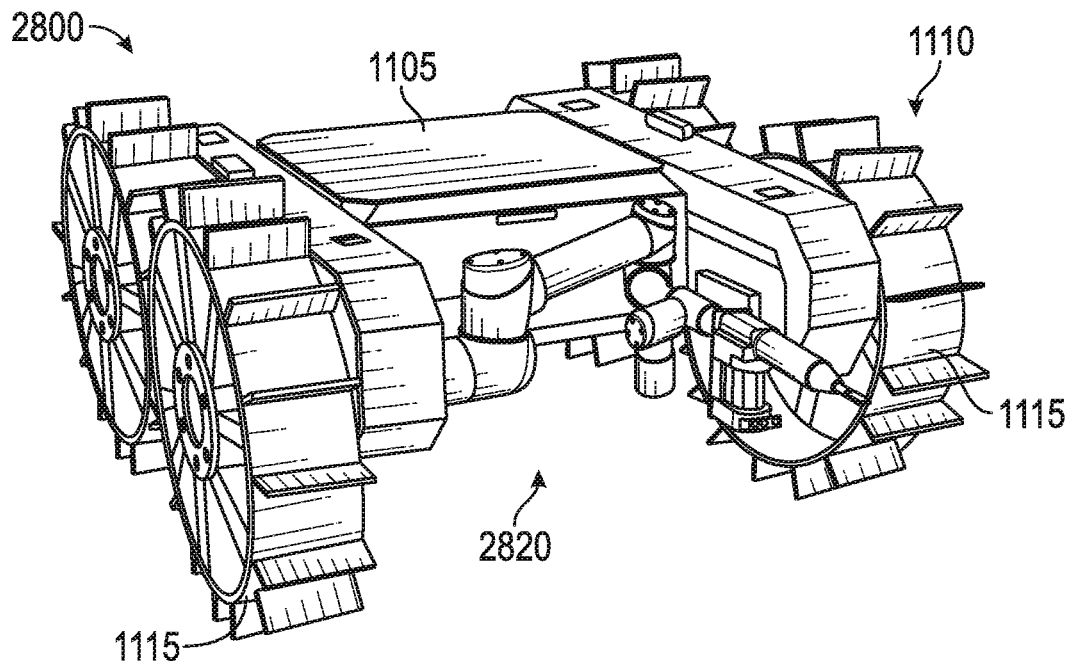

FIG. 9C shows an example of a lunar digger bot 2800. The lunar digger bot 2800 may include the universal platform 1105. The lunar digger bot 2800 may include the mobility platform 1110. The mobility platform 1110 may include the lunar wheeled module 1115. The lunar digger bot 2800 may include a digger payload stack 2820, similar to the digger payload stack 1220 described above.

Figure 10A:
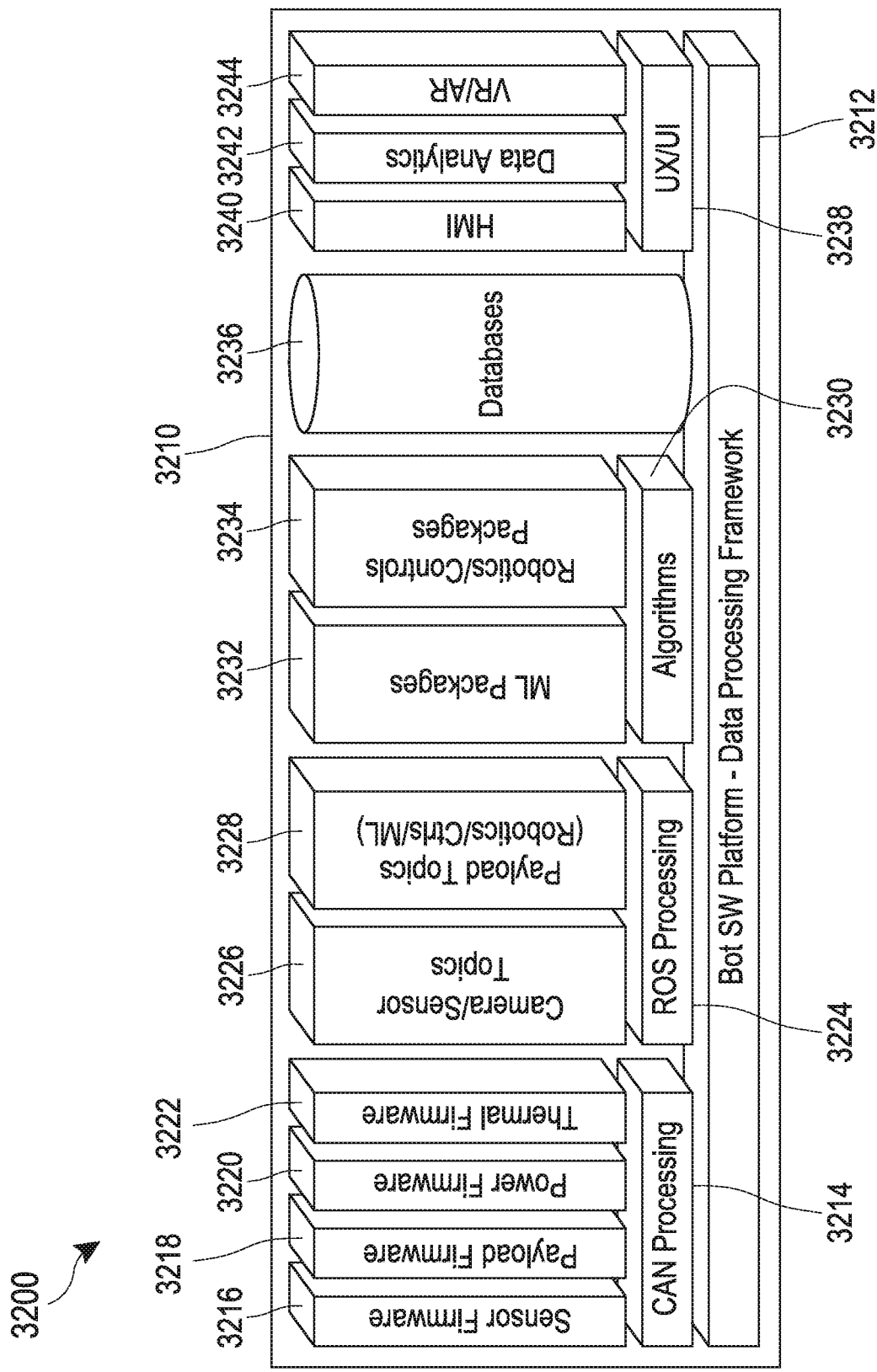
FIGS. 10A-10C are, respectively, block diagrams of embodiments of a robotic software platform, a robotic hardware platform, and an industrial robot having features that may be used with any of the industrial robots of FIGS. 1-9C.

B. Swarm Robotic Architecture—Example Hardware/Software for Remote Control Center, a Colony Control Center, and an Industrial Bot FIG. 10A is a block diagram of an example of an industrial robotic system 3200. The industrial robotic system 3200 may include a bot software platform and control center architecture, as further described. The bot 3210 is shown as a block diagram with various modules. For each bot or "species" of bot, a configuration of hardware and software modules required for the specific universal and payload stacks (e.g., payload-specific tools or sets of tools) may be generated so that the bot may be assembled at the hardware and software level. All systems may be modularized so that simplicity in the hardware and software functional assembly is persistent across species of bots. Standard interfaces may be implemented so that integration overhead is minimal for structural, power and data interfaces. In some implementations, universal interfaces may control the data, power and consumables flow between modules.

The bot 3210 includes a processor 3212, shown as a software processing framework. The processor 3212 may be the main structural architecture that manages data processing across the different architectural modules, for example ensuring data integrity, minimal latency, delivery assurance, archiving and visualization. The processor 3212 may be in communication with one or more modules for controlling and/or managing the bot 3210. As shown, the processor 3212 is in communication with a controller area network (CAN) processing module 3214. The CAN processing module 3214 interfaces with firmware controllers for those hardware modules integrated in the CAN bus. As shown, the CAN processing module 3214 interfaces with sensors firmware 3216, payload firmware 3218, power firmware 3220, and thermal firmware 3222.

In some implementations, the underlying data processing architecture may include a data management module. The data management module may include an open source, in-memory data structure store, used as a database, cache and message broker, such as a redis database. The data management module may include interfaces and APIs configured to transact operations and telemetry with the CAN, the robot operating system (ROS), and other processing frameworks in the bot 3210. The architecture may also include a human machine interface (HMI) to operate robot missions, an injector to an influx DB relational database or equivalent to visualize operational data in.

The processor 3212 is further in communication with a robot operating system (ROS) processing module 3224. The ROS processing module 3224 interfaces with one or more processing modules for sensors and packages integrated into the ROS. As shown, the ROS processor 3224 is in communication with sensor modules 3226, shown as Camera/Sensor Topics, and payload modules 3228, shown as a Payload Topics (robotics/controls/machine learning).

In some implementations, the payload modules 3228 may include a Robotic Saw or robosaw module. The Robotic Saw or robosaw module may be used to control a saw or saw-like tool for material cutting, such as with a digger bot. The Robotic Saw or robosaw module may be configured for the autonomous robotic operation of a saw, such as a commercial off the shelf saw or custom saw. The Robotic Saw or robosaw module may be configured to control a robotic arm integrated with a saw. The Robotic Saw or robosaw module may include software packages, scripts and files to operate the saw, including the control systems to adjust the operation based on feedback loops using force, power, RGBD camera, and/or other inputs.

In some implementations, the payload module 3228 may include a Robotic Chisel or robochisel module. The same or similar features as described for the robosaw module may apply to the robochisel module but for operation of a chisel or chisel-like tool for material excavation or demolition, such as with a digger bot. The robochisel module may be configured to autonomously control a chisel or similar tool for removing rock, concrete, or other materials in the course of mining, constructions, and other contexts to which the architecture and bots are applied. The robochisel module may include software packages, scripts and files to operate the chisel, including the control systems to adjust the operation based on feedback loops using force, power, RGBD camera, and/or other inputs. A robotic arm attached to the chisel may also be controlled.

The processor 3212 is further in communication with an algorithms processing module 3230. The algorithms processing module 3230 is in communication with an artificial intelligence module 3232, shown as machine learning (ML) packages, and a controls module 3234, shown as robotics/controls packages. In some implementations, the robotics, controls and ML Packages may be directly embedded in the main processing framework in Python or C++.

Artificial intelligence (AI), such as machine learning, may be persistent throughout a colony. Artificial intelligence may be implemented by means of robust robotic and controls algorithms and machine learning, e.g. reinforcement learning, deep reinforcement learning, and/or other methodologies. Machine learning agents may be embedded at the bot, squad and/or colony levels. The squads as a whole, and/or the colony as a whole, may behave as a swarm driven by intelligent decision making performed at every level in the colony.

In some implementations, the bot 3210 may include a quadrant manager module. The quadrant manager module may be part of the artificial intelligence module 3232, the controls module 3234, or other modules. The quadrant manager module may be configured to autonomously break down an image collected by the bot of the topography of an excavation panel into contiguous individual panels for excavation. The quadrant dimensions may be configurable based on operator input.

In some implementations, the bot 3210 may include a targeter module. The targeter module may be part of the artificial intelligence module 3232, the controls module 3234, or other modules. The targeter module may include ML or other AI algorithms for the use of various tools or combinations thereof, such as robot arms and/or demolition hammers, to intelligently target the regions in the panel to excavate/demolish.

The processor 3212 is further in communication with one or more databases 3236. The database 3236 may be a memory where data is stored. Data processing framework configuration data, real time operational data, and/or other data may be stored and archived in the one or more databases 3236 for real-time operations, post-processing, visualization, etc. In some implementations, one or more of the databases 3236 may be remotely located from the bot 3210, such as at a colony control center.

The processor 3212 is further in communication with a user interface module 3238. The user interface module 3238 is in communication with a human-machine interface (HMI) module 3240, a data analytics module 3242, and/or a virtual reality/augmented reality (VR/AR) module 3244. The user interface module 3238 may be accessed directly in an on-board processor or remotely via a virtual private network (VPN) or secure encrypted connection.

The bot 3210 may transmit data, for example via a colony communications network such as a wireless ad-hoc network, to a colony control center, for example for monitoring and support of the bots 3210 and/or a colony. The data may be monitored and managed in whole or in part by human operators performing supervisory control of the operations.

In some implementations, the remote control center may include a remote communication system, a command and control system, and/or a user interface. The remote communication system may be configured to receive all data from the colony control center and transmit update data to the colony control center via a remote communications network. The command and control system may include one or more computers, servers, switches, databases, etc. configured to monitor, control, process, store and update the colony data. The user interface (e.g. displays, HMI, AR, VR, etc.) may be configured to enable a user to remotely monitor and control the colony and/or colony control center. The colony control center may include a colony communications network/communications system. The colony communications network/communications system may receives data of various types from any number of bots, squads, platoons, colonies. The supervisory command and control system may analyze the incoming data (among other tasks) and generate updated data. The updata data may include commands, priorities, behaviors, missions, plans, revisions to existing tasks, operational thresholds, virtual fences, and/or general high-level operating instructions. This update data is communicated to any number of bots, squads, platoons, colonies via the colony communications network/communications system. Communication of the update data may be continuous (e.g., not serial). Communication of the updata data may occur in real-time, with an infinite number of parallel streams being communicated, multi-directionally. The supervisory command and control system, along with the colony communications network/communications system, may be distributed, such that a separate entity for each need not exist (e.g., may be distributed across any number of bots, squads, platoons, colonies and/or other elements).

The divide and conquer approach to swarm operations described herein may include a system where a single organism does not have to do everything nor be only one size. The specialization allows for each bot to do one or a select number of tasks proficiently. It may thus be easy to train on one function where there is a flexibility in collaboration of functions. The system may allow for rapid reconfiguration of the weighting of each function to respond quickly to changes or progress in the execution of a particular industrial objective. These may manifest in various ways, e.g., not only changing the functions of each bot as needed but adapting and improving and especially right sizing the workforce to the size of the job permanently, so that there is never an overcapacity.

C. Industrial Robot—Example Computing Hardware for Industrial Bot

Figure 10B:
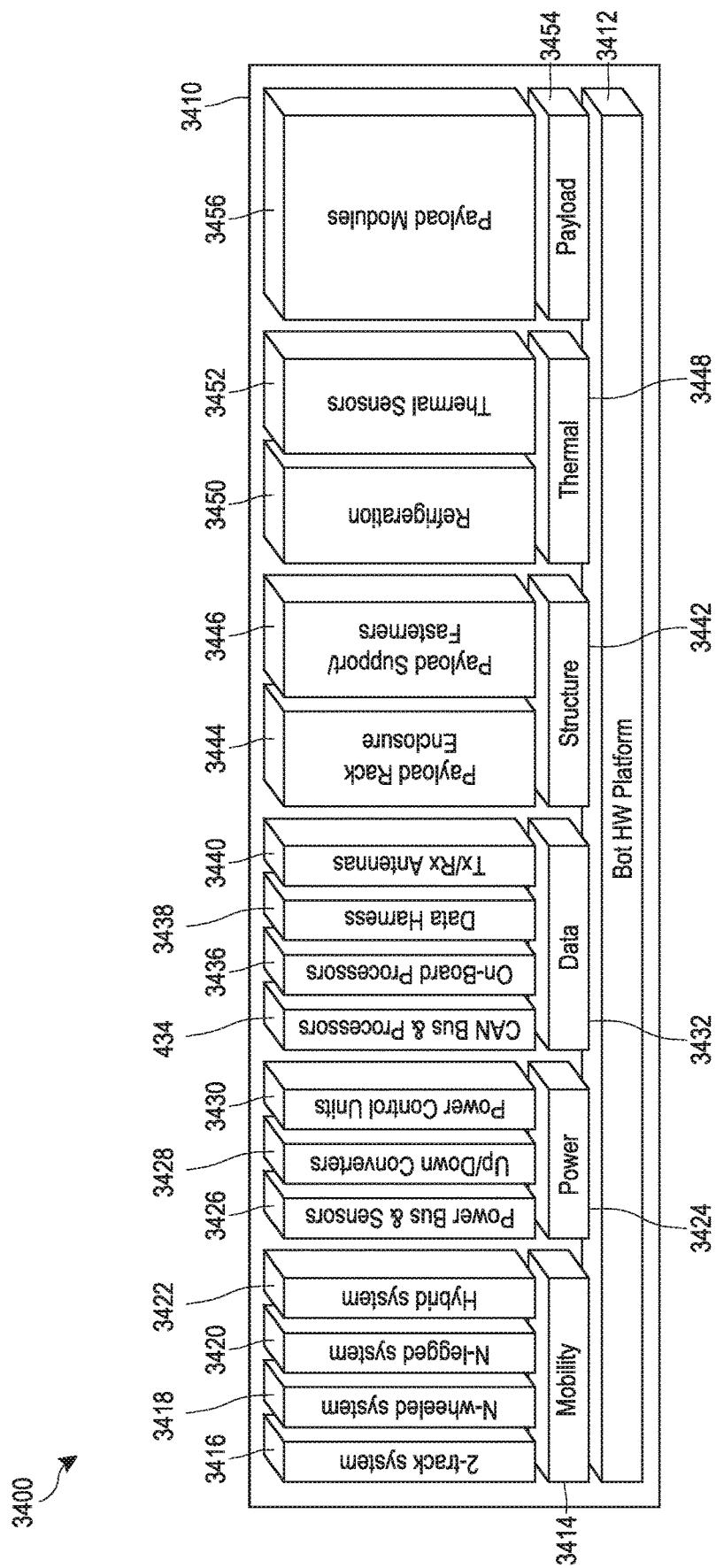

FIG. 10B is a block diagram of an example of a bot 3400. The bot 3400 may be used with any of the various systems described herein, such as the system 3200. The bot 3400 may have the same or similar features and/or functions as the bots shown in and described in FIGS. 1-9, and vice versa, and the robotic hardware platform that may be used with the systems of FIGS. 1-9.

The bot 3400 includes an overall hardware platform 3412. The hardware platform 3412 integrates hardware subsystems, each of which may include subsystem and structural hardware, computer hardware, and/or software that may be architected as described in 3210.

The bot 3400 includes a mobility platform 3414. The mobility platform 3414 can be similar to the mobility platform 1110 describe above and vice versa. The mobility platform 3414 may include one or more of the following: a 2-track module 3416, an N-wheeled module 3418, an N-legged module 3420, and a hybrid module 3422. The hybrid module 3422 may include a combination of tracks, wheels and/or legs. The mobility platform 3414 is configured to be operated to cause the bot 3400 to move, such as by commanding an actuator to move the track, wheel, leg, etc. The various mobility modules are dedicated to moving the bot 3400. Different types of modules may be integrated with the universal platform structural frame.

The bot 3400 includes a power platform 3424. The power platform 3424 can be similar to the power module 1108 and vice versa. The power platform 3424 may include one or more of the following: a power bus and sensor module 3426, a voltage/current up/down converter module 3428, and one or more power control modules 3430. The various power modules may include power buses and/or wiring harnesses, controllers and hardware to supply power to the different hardware modules at the right voltage and with the necessary protections against over/under currents, shorts, and electro static discharge (ESD).

The bot 3400 includes a data platform 3432, shown as a bus. The data platform 3432 can be similar to the data module 1107 and vice versa. The data platform 3432 may include one or more of the following: a CAN bus and processors module 3434, one or more on-board processor modules 3436, a data harness module 3438, and one or more antenna modules 3440 for transmitting and/or receiving communication signals. The data platform 3432 may be a CAN, UDP, RS232, TCP/IP or equivalent, or a combination of the above type bus. The various data bus modules may include data processing controllers and firmware, an on-board processor required to control and operate all modules in the bot 3400, and/or communications components such as an antenna to transmit and receive data.

The bot 3400 includes a structure platform 3442. The structure platform 3442 can be similar to the structural platform 1106 described above and vice versa. The structure platform 3442 may include one or more of the following: a payload rack module 3444 such as an enclosure, and a payload support module 3446. The structure platform 3442 may provide a universal platform configured to support a variety of different task-specific payloads, such as different tools used for specific tasks for achieving an industrial objective. The structure platform 3442 may include a payload rack enclosure, such as a flat bed with side walls and cover, in or with which the other modules, such as the payload and universal modules, may be integrated and enclosed, for environmental control, etc.

The bot 3400 includes a thermal platform 3448. The thermal platform 3448 can be similar to the thermal module 1109 describe above and vice versa. The thermal platform 3448 may include one or more of the following: a thermal management module or set of modules 3450 shown as a refrigeration module, and a thermal sensor module 3452. The module 3450 may be a heating module. The thermal sensor module 3452 may include a variety of thermal sensors providing data related to temperature of various components of the bot 3400 that the thermal management module 3450 may use to increase or decrease heating or cooling to the various components. The various thermal modules may include heating or cooling units, pipes or conduits, and/or thermal sensors required to thermally control the hardware modules of the hardware platform 3412.

The bot 3400 includes a payload platform 3454. The payload platform 3454 includes one or more payload modules 3456. The payload modules 3456 may include one or more payload tools that may or may not be collocated on the same structure, for performing one or more specific industrial tasks. Each tool may be used for performing a specific industrial task, which in collaboration with other bots 3400 performing other specific industrial tasks, may be performed to achieve an industrial objective, for example mining, as further described herein. The various payload modules may be integrated with the universal platform stack to fulfill the specific task for that payload.

In some implementations, the bot 3400 may include a universal platform that comprises a robotic hardware platform. The robotic hardware platform may include a structural frame configured to support the universal platform and payload stacks/tools. The robotic hardware platform may include the mobility platform 3414 coupled with the frame and configured to move the bot 3400. The robotic hardware platform may include the power system 3424 configured to power the mobility platform 3414 and the payload platform 3454. The robotic hardware platform may include the thermal system 3448 configured to thermally control the universal and payload stacks. The robotic hardware platform may include the data processing system 3432 configured to control the universal and payload stacks. The robotic hardware platform may include the antenna module 3440 configured to transmit first data from, and receive second data to, the bot 3400. The robotic hardware platform may include a data bus configured to interface with the data processing system 3432.

In some implementations, the bot 3400 may include a universal platform that comprises a robotic software platform. The bot 3400 may include the hardware and software platforms. The robotic software platform may comprise of the modules described in the bot 3210. The robotic software platform may comprise of a controller layer having firmware configured to operate the universal and payload stacks using universal and payload control algorithms. The robotic software platform may comprise an architecture stack including one or several data protocol layers configured to monitor data from the universal and payload control algorithms and to transmit the data to the hardware firmware controllers. The robotic software platform may comprise a robotic control algorithm layer dedicated to control, monitor and operate the universal and payload hardware to perform the bot-specific robotic task. The robotic software platform may comprise a database system, for supporting software packages and components dedicated to support the operation of the system and configured to store and process the system operational data.

Various example examples are described herein with respect the mining industrial task. The systems and methods may be used for other industrial tasks such as construction, manufacturing, demolition, satellite swarms, fuel production, disaster recovery, communications, remote power, and others, deployed terrestrially on-land and underwater, in free space, on the Moon, Mars and other celestial bodies.

In some implementations, the systems and methods may be used for swarm robotic mining (SRM). The SRM colony may include functional squads that perform the end-to-end mining function. The primary squad may be the mining squad, which may include multiple "species," as further described. The functional squads may be grouped in platoons, where squads of the same or different function are grouped based on the topography of the site and economic performance metrics defined for the colony.

The mining squad may be used to replace drill-blast-mine and primary concentration function of conventional mining approaches. No macro-blasting may be required. Instead, the swarm squads deploy in the mine panels to pre-condition and excavate rock through the use of different payload technologies optimized for ultra-precision mining. Mining is followed by in-situ concentration of the material by means of crushing it into fine particulate concentrate that can be moved out of the mine or fed into a fluidized bed for in-situ flotation of the material. The flotation product is either hydro-hoisted, conveyed or transported by sweeper/hauler bots out of the mine.

In some implementations, and as further described, one or more of the bots may be a digger bot configured to pre-condition and break rock. In some implementations, one or more of the bots may be a crusher bot configured to collect and/or crush the rock. In some implementations, one or more of the bots may be a flotation bot configured to float the concentrated particulate to extract target material. Other filtration approaches may be implemented.

Figure 10C:
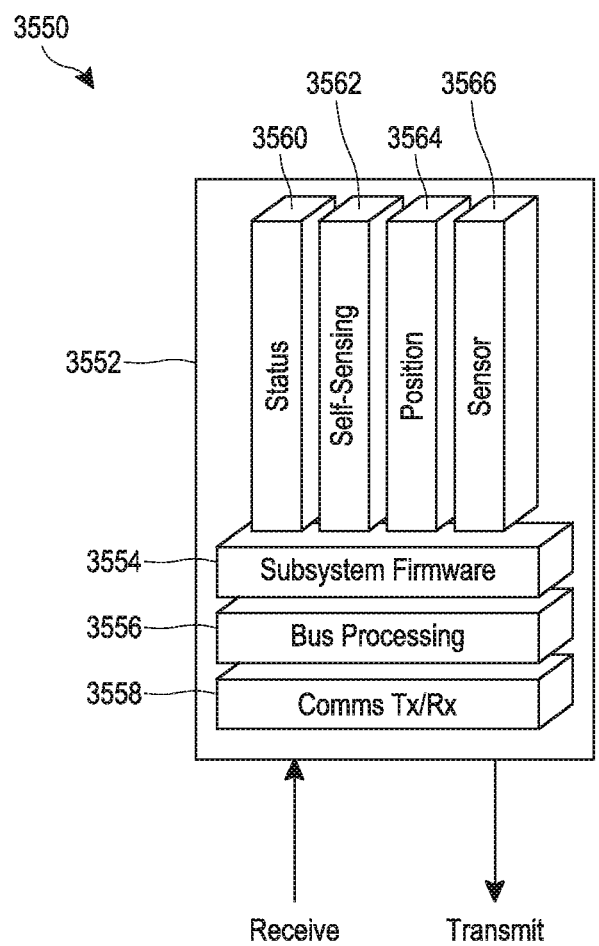

D. Swarm Robotic Architecture—Example Hardware/Software for Colony Control Center and Squads of Industrial Bots FIG. 10C is a block diagram of an example of an industrial robotic system 3550. The industrial robotic system 3550 may be used as the industrial robotic system 3200 of FIG. 10A, and vice versa. The bot 3552 includes a subsystem firmware 3554. The subsystem firmware includes an operations module 3560, a status module 3562, a position module 3564, and a sensor or sensor module 3566. Subsystem data may be generated in the bot subsystem firmware and analyzed using the various modules. The operations module 3560 may analyze subsystem data that includes data related to operational status of the bot 3552, such as mining subsystem data, for instance excavation parameters, etc. The status module 3562 may analyze subsystem data that includes data related to bot system housekeeping, temperature, fault status, etc. The position module 3564 may analyze subsystem data that includes data related to bot geo-location, relative subsystem position such as positions or orientations of articulated components such as arms, legs, tools, etc. The sensor module 3566 may analyze subsystem data that includes data related to video and data streams.

The bot 3552 includes a bus processing system 3556. The bus processing system 3556 is the platform bus that distributes the data for subsequent operation. The bus processing system 3556 may process the data based on application of a swarm algorithm to the firmware data received from the subsystem firmware 3554 of the bot 3552. The data may be received from the bot 3552 and/or from other bots, such as neighboring bots, bots within the same squad and/or colony.

The data may be received from one or more control centers, such as the colony or remote control centers, and may be via one or more of the communication networks described herein.

The bot 3552 includes a communications system 3558. The communications system 3558 may be configured to transmit and receive the various data from and to the bot 3552. The communications system 3558 may package the data for transmission. The communications system 3558 may relay data received, for example data received from neighboring bots. The communications system 3558 may identify and/or decommutate relevant data received for processing by the bus processing system 3556. The communications system 3558 may communicate with a colony communications network.

In the context of industrial mining operations, such data transmission may be from one or more bots 3552 within a mine shaft (vertical, inclined, helix or other geometry), stope, panel, tunnel or equivalent, to one or more bots 3552 within a neighboring or access shaft (vertical, inclined, helix or other geometry), stope, panel, tunnel or equivalent all the way to the surface to a colony control center by means of communications from bot to bot and/or via the communications network.

Data may be transmitted/received to/from the bot 3552. Various approaches to the communications networks describe herein may be implemented. In some implementations, networking is accomplished by means of a mobile ad-hoc network. It may be a fixed network. The network may be set up by humans, or by one or more of the bots. All or some data transfer may be supported at the bot, squad and/or colony level of the architecture.

Each bot may include a data packet bot node subscription. Each data packet may have a header that provides identification information related to the bot, squad, platoon and packet type. Neighboring bots within a squad may subscribe to, receive, process, and transmit data packets necessary for swarm behavior. Neighboring squads within a colony, such as within platoons, may subscribe to, receive, process, and transmit data packets necessary for mid-scale situational awareness, such as at the squad level. Neighboring platoons within a colony may subscribe to, receive, process, and transmit data packets necessary for mid-scale situational awareness, such as at the platoon level. Neighboring colonies may subscribe to, receive, process, and transmit data packets necessary for macro-scale situational awareness, such as at the colony level. The identification information may include a colony identifier, a platoon identifier, a squad identifier, a bot identifier, a bot location identifier, a bot position identifier, health data, performance data, operational data, housekeeping data and/or sensor data.

The communications network may evolve as the systems are implemented and used. In some implementations, for example in initial or partial deployments at conventional sites, the network may be established through fixed infrastructure by humans. For more mature colonies, the ad-hoc network grid may be established by bots with networking payloads (e.g., nodes). The network may be dynamically updated so that high density operation regions in the colony, for example at a particular deployment, site are supported at all times with the required bandwidth, etc. A manned control center, such as the colony control centers described herein, may be deployed at the colony site and may be the only human interface to the bots. The colony control center may be connected to bots in the colony through the colony communications network. The colony control center may also be connected to a remote control center, for example located offsite, via satellite or terrestrial networks. The colony control center may be where humans perform monitoring and exception management as well as other offline support functions.

There are various uniquely desirable features of the architecture systems and methods using the autonomous bots. For example, the required infrastructure may be minimized, for instance due to fewer humans in the loop. There may be significant reduction in safety costs due to fewer humans. In the mining context, there may be greater ability to access ore bodies that are not currently accessible for economic and other reasons. There may be greater ability to access ore bodies that are not currently accessible by human miners.

As further example, within the mining context, the bot form factor may be optimized based on the ore body and payload requirements, so that the bot may follow the ore body with minimal waste excavation. This approach enables several key advantages over conventional mining. For example, avoiding the need for macro-blasting means less impact to the structural integrity of the mine, leading to less bolting and bracing on the mine structure. Further, conventional mining requires structurally providing access to human miners and heavy machinery. In contrast, the robotic approaches described herein provide for minimal waste rock excavation through bot form factor and ultra-precise mining, which allows for increased productivity and reduced mine structural complexity. Further, in-situ concentration means that the excavated material does not need to be moved out of the mine and trucked into a concentration plant sometimes a large distance away, but rather it may be done on-site reducing material transport complexity. Given that minimal waste rock is excavated, the total volume of rock that is moved is reduced as well. Further, the use of in-situ flotation In some implementations means the excavated rock is further concentrated so that only the target material in the ore is moved out of the mine. This further reduces the total volume of material excavated out of the mine, sometimes to a small fraction of the total excavated ore.

While the above detailed description has shown, described, and pointed out novel features of the development as applied to various examples, it will be understood that various omissions, substitutions, and changes in the form and details of the systems or processes illustrated may be made by those skilled in the art without departing from the spirit of the development. As will be recognized, the present development may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope. The systems, devices, and methods may thus be practiced in many ways.

It will also be appreciated by those of skill in the art that parts included in one example are interchangeable with other examples; one or more parts from a depicted example may be included with other depicted examples in any combination. For example, any of the various components described herein and/or depicted in the Figures may be combined, interchanged or excluded from other examples. The use of headings is for ease of reading only, and is not meant to limit the scope of the disclosure in any way. Any features or examples from one heading section may be applied to any other features or examples of other heading sections.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). The term "comprising" as used herein is synonymous with "including," "containing," or "characterized by," and is inclusive or open-ended and does not exclude additional, unrecited elements or method steps.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities used in the specification and claims are to be understood as being modified in all instances by the term "about," unless otherwise indicated. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various examples, of ±1%, ±5%, ±10%, or ±20%.

All references cited herein are incorporated herein by reference in their entirety. To the extent publications and patents or patent applications incorporated by reference contradict the disclosure contained in the specification, the specification is intended to supersede and/or take precedence over any such contradictory material.

What is claimed is:

1. An industrial bot configured to operate autonomously in a swarm robotic system to complete a collaborative industrial objective on a celestial body, the industrial bot comprising:
    a payload stack configured to perform a bot-specific industrial task to interact with a rock face or other environmental feature of the celestial body; and
    a universal platform stack supporting the payload stack, wherein the payload stack is one among a plurality of interchangeable different payload stack types that the universal platform stack is configured to support, the universal platform stack comprising:
        a modular robotic hardware platform comprising supporting structure, the robotic hardware platform having been assembled with a first hardware module configuration that is one among a plurality of other possible hardware module configurations, wherein the first hardware module configuration is specific to the bot-specific industrial task and the payload stack, and wherein the plurality of other possible hardware module configurations are specific to other bot-specific industrial tasks and payload stacks,
        a control system configured to control the universal platform stack, and
        a modular robotic software platform configured to operate the robotic hardware platform to perform the bot-specific industrial task using the payload stack, the robotic software platform having been assembled with a first software module configuration that is one among a plurality of other possible software module configurations, wherein the first software module configuration is specific to the bot-specific industrial task and the payload stack, and wherein the plurality of other possible software module configurations are specific to other bot-specific industrial tasks and payload stacks.

2. The industrial bot of claim 1, the robotic hardware platform comprising:
    a frame configured to support the payload stack;
    a mobility system coupled with the frame and configured to move the industrial bot; and a power system configured to power the mobility system and the payload stack.

3. The industrial bot of claim 1, the control system comprising:
a on-board processor configured to operate the robotic hardware platform and the robotic software platform;
a communications system configured to transmit and receive data across a colony communications network; and
a data bus configured to interface with the on-board processor and one or more hardware platform control modules.

4. The industrial bot of claim 3, the robotic software platform comprising:
a robot operating system configured to execute a robotic control algorithm to operate the robotic hardware platform to perform the bot-specific industrial task;
a hardware processor module configured to interface with firmware of the one or more hardware platform control modules;
a database configured to store operational data of the robotic hardware platform and the robotic software platform; and
a user interface module configured to enable a user to remotely access and control the robot operating system.

5. The industrial bot of claim 4, wherein the robot operating system is configured to execute the robotic control algorithm by:
establishing autonomous communications with a second industrial bot through a colony communications network;
receiving a first data related to the collaborative industrial objective from the second industrial bot via the colony communications network; and
performing the bot-specific industrial task in response to receiving the first data, wherein performing bot-specific industrial task based on the first data results in achieving the collaborative industrial objective.

6. The industrial bot of claim 1, wherein the payload stack comprises a chisel, a saw, or a sweeper.

7. The industrial bot of claim 1, wherein the industrial bot is a mining bot configured as a digger bot, a crusher bot, a sweeper bot, a flotation bot, a shotcrete bot, a welder bot, a manipulator bot, a bolting bot, or a pump bot.

8. The industrial bot of claim 1, wherein the bot-specific industrial task comprises pre-conditioning rock, breaking rock, collecting excavated rock, filtering/concentrating excavated rock, transporting excavated rock, applying cementitious material to a tunnel, reinforcement bolting a tunnel, or suctioning water from a tunnel.

9. The industrial bot of claim 1, wherein the bot is a mining bot and the payload stack comprises a robotic chisel system.

10. The industrial bot of claim 1, wherein the bot is a mining bot and the payload stack comprises a robotic saw system.

11. The industrial bot of claim 1, wherein the bot is a mining bot and the payload stack comprises a robotic sweeper system.

12. The industrial bot of claim 1, wherein the bot is a mining bot and the payload stack comprises a robotic conveyor system.

13. The industrial bot of claim 1, wherein the bot is a mining bot and the payload stack comprises a robotic crusher system.

14. The industrial bot of claim 1, wherein the robotic software platform comprises a robotic control algorithm layer configured to control, monitor, and operate the robotic hardware platform to perform the bot-specific industrial task.

15. The industrial bot of claim 1, wherein the modular robotic software platform in the first software module configuration comprises a processor in communication with one or more of the following modules: a controller area network (CAN) processing module, a robot operating system (ROS) processing module, an algorithms processing module, and a user interface module.

16. The industrial bot of claim 15, wherein the processor is in communication with at least the CAN processing module, and wherein the CAN processing module comprises one or more of the following: sensor firmware, payload firmware, power firmware, and thermal firmware.

17. The industrial bot of claim 15, wherein the processor is in communication with at least the ROS processing module, and wherein the ROS processing module comprises one or more of the following: a sensor module and a payload module.

18. The industrial bot of claim 15, wherein the processor is in communication with at least the algorithms processing module, and wherein the algorithms processing module comprises one or more of the following: an artificial intelligence module and a controls module.

19. The industrial bot of claim 15, wherein the processor is in communication with at least the user interface module, and wherein the user interface module comprises one or more of the following: a human-machine interface (HMI) module, a data analytics module, and a virtual reality/augmented reality (VR/AR) module.

20. The industrial bot of claim 1, wherein the modular robotic hardware platform in the first hardware module configuration is in communication with one or more of the following: a mobility platform, a power platform, a data platform, a structure platform, a thermal platform, and a payload platform.

21. The industrial bot of claim 20, wherein the processor is in communication with at least the mobility platform, and wherein the mobility platform comprises one or more of the following: a 2-track module, an N-wheeled module, an N-legged module, and a hybrid module.

22. The industrial bot of claim 20, wherein the processor is in communication with at least the power platform, and wherein the power platform comprises one or more of the following: a power bus and sensor module, a voltage/current up/down converter module, and one or more power control modules.

23. The industrial bot of claim 20, wherein the processor is in communication with at least the data platform, and wherein the data platform comprises one or more of the following: a CAN bus and processors module, one or more on-board processor modules, a data harness module, and one or more antenna modules.

24. The industrial bot of claim 20, wherein the processor is in communication with at least the structure platform, and wherein the structure platform comprises one or more of the following: a payload rack module and a payload support module.

25. The industrial bot of claim 20, wherein the processor is in communication with at least the thermal platform, and wherein the thermal platform comprises one or more of the following: a thermal management module and a thermal sensor module.

26. An industrial bot configured to operate autonomously in a swarm robotic system to complete a collaborative industrial objective on a celestial body, the industrial bot comprising:
  a universal platform stack comprising:
    a robotic hardware platform comprising:
      a frame configured to support the universal platform stack and a payload stack;
      a mobility system coupled with the frame and configured to move the industrial bot, wherein the mobility system is one among a plurality of different mobility system types with which the frame is configured to couple;
      a power system configured to provide power to the industrial bot;
      a control system comprising an on-board processor;
      a communications system configured to transmit and receive data to and from the industrial bot; and
      a data bus configured to interface with the on-board processor;
    a robotic software platform comprising:
      a robot operating system (ROS) configured to execute a robotic control algorithm to operate the robotic hardware platform to perform a bot-specific industrial task to interact with a rock face or other environmental feature of the celestial body;
      a hardware processor module configured to interface with the control system;
      a database configured to store operational data; and
      a user interface module configured to enable a user to remotely communicate with the ROS;
      wherein the robotic software platform is modularized and is assembled in a first software module configuration among a plurality of other possible software module configurations, wherein the first software module configuration is specific to the bot-specific industrial task; and
  a payload stack configured to perform the bot-specific industrial task.

27. The industrial bot of claim 26, wherein the payload stack comprises a chisel, a saw, a sweeper, a conveyor or a crusher.

28. The industrial bot of claim 26, wherein the industrial bot is a digger bot, a crusher bot, a sweeper bot, a flotation bot, a shotcrete bot, a welder bot, a manipulator bot, a bolting bot, or a pump bot.

29. The industrial bot of claim 26, wherein the bot-specific industrial task comprises pre-conditioning rock, breaking rock, collecting excavated rock, filtering excavated rock, transporting excavated rock, applying cementitious material to a tunnel, reinforcement bolting a tunnel, or suctioning water from a tunnel.

30. The industrial bot of claim 26, wherein the robotic control algorithm includes the steps of:
  establishing autonomous communications with a second industrial bot through a colony communications network;
  receiving a first data related to the collaborative industrial objective from a second industrial bot via the colony communications network; and
  performing the bot-specific industrial task in response to receiving the first data, wherein performing the bot-specific industrial task based on the first data results in achieving the collaborative industrial objective.

31. The industrial bot of claim 30, wherein the industrial bot is a digger bot, the second industrial bot is a sweeper bot, the first data relates to excavation and the collaborative industrial objective is collecting rock excavated by the digger bot with the sweeper bot.

32. The industrial bot of claim 30, wherein the industrial bot is a digger bot, the second industrial bot is a crusher bot, the first data relates to excavation and the collaborative industrial objective is crushing rock excavated by the digger bot with the crusher bot.

* * * * *